(12) United States Patent
Mortazawi et al.

(10) Patent No.: US 7,728,772 B2
(45) Date of Patent: Jun. 1, 2010

(54) PHASED ARRAY SYSTEMS AND PHASED ARRAY FRONT-END DEVICES

(75) Inventors: Amir Mortazawi, Ann Arbor, MI (US); Lora S. Schulwitz, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 417 days.

(21) Appl. No.: 11/449,925

(22) Filed: Jun. 9, 2006

(65) Prior Publication Data

US 2007/0285314 A1  Dec. 13, 2007

(51) Int. Cl.
*H01Q 3/22* (2006.01)
(52) U.S. Cl. .................................... 342/375
(58) Field of Classification Search ................ 327/404; 343/854, 754, 853, 858, 910, 111 R, 911; 342/81, 154, 368–375
See application file for complete search history.

(56) References Cited

U.S. PATENT DOCUMENTS

| | | | | |
|---|---|---|---|---|
| 4,176,322 | A * | 11/1979 | Kommrusch | 343/754 |
| 5,952,966 | A * | 9/1999 | Smith | 342/373 |
| 6,031,501 | A * | 2/2000 | Rausch et al. | 343/754 |
| 6,087,907 | A | 7/2000 | Jain | |
| 6,295,026 | B1 * | 9/2001 | Chen et al. | 342/368 |
| 6,720,931 | B1 * | 4/2004 | Michisaka et al. | 343/754 |
| 6,982,676 | B2 * | 1/2006 | Sievenpiper et al. | 343/754 |
| 2002/0126062 | A1 * | 9/2002 | Matthews | 343/795 |
| 2004/0207567 | A1 * | 10/2004 | Sievenpiper et al. | 343/911 R |
| 2005/0026571 | A1 * | 2/2005 | Yang et al. | 455/78 |
| 2005/0099222 | A1 * | 5/2005 | Yang et al. | 327/404 |

OTHER PUBLICATIONS

Al-Zayed et al., "A dual polarized millimeter-wave multibeam phased array," *IEEE MTT-S Int. Microwave Symp. Dig.*, vol. 1, pp. 87-90 (2004).
Ali-Ahmad et al., "92 GHz dual-polarized integrated horn antennas," *IEEE Trans. Antennas Propagat.*, vol. 39, No. 6, pp. 820-825 1991.
Archer, "Lens-fed multiple beam arrays," *Microwave J.*, pp. 171-195 (1984).
Chio et al., "A Rotman lens fed ridge-element multibeam array demonstrator," *IEEE Antennas and Propagation Society Int'l Symposium*, vol. 1, pp. 655-658 (2004).
Ellis et al., "MM-wave tapered slot antennas on micromachined photonic bandgap dielectrics," *IEEE MTT-S Digest*, pp. 1157-1160 (1996).

(Continued)

*Primary Examiner*—Thomas H Tarcza
*Assistant Examiner*—Nga X Nguyen
(74) *Attorney, Agent, or Firm*—Marshall, Gerstein & Borun LLP

(57) ABSTRACT

Disclosed herein is a front-end device for a phased array system. The front-end device includes an array of horn antennas, a first set of transmission lines coupled to the horn antenna array for a first polarization, a second set of transmission lines coupled to the horn antenna array for a second polarization orthogonal to the first polarization, and a plurality of L-shaped excitation elements. Each L-shaped excitation element of the plurality of L-shaped excitation elements couples a transmission line from each of the first and second sets of transmission lines to a respective horn antenna of the horn antenna array.

20 Claims, 16 Drawing Sheets

OTHER PUBLICATIONS

Gauthier et al.,"Microstrip antennas on synthesized low dielectric-constant substrates," *IEEE Transactions on Antennas Propagation*, vol. 45, p. 1310-1314 (1997).

Granholm et al. "Dual polarization stacked microstrip patch antenna array with very low cross-polarization,", *IEEE Trans. Antennas Propagat.*, vol. 49, No. 10, pp. 1393-1402 (2001).

Lenzing et al., "Machined waveguide twist," *IEEE Trans. Microwave Theory Tech.*, vol. 38, pp. 942-944 (1990).

Metz et al., "Fully integrated automotive radar sensor with versatile resolution," *IEEE Trans. Microwave Theory & Tech.*, vol. 49, No. 12, pp. 2560-2566 (2001).

Ortiz et al., "A Ka-band perpendicularly-fed patch array for spatial power combining," *IEEE MTT-S Int. Microwave Symp. Dig.*, vol. 3, pp. 1519-1522 (2002).

Ortiz et al., "A perpendicular aperture-fed patch antenna for quasi-optical amplifier arrays," *IEEE AP-S Int. Symp. Dig.*, vol. 4, pp. 2386-2389 (1999).

Popovic et al., "Multibeam antennas with polarization and angle diversity," *IEEE Trans. Antennas Propagat.*, vol. 50, No. 5, pp. 651-657 (2002).

Rotman et al., "Wide-angle microwave lens for line source applications," *IEEE Trans. on Antenna and Prop.*, vol. AP-11, pp. 623-632 (1963).

Russell at al., "Millimeter-wave radar sensor for automotive intelligent cruise control," *IEEE Trans. Microwave Theory & Tech.*, vol. 45, No. 12, pp. 2444-2453 (1997).

Schulwitz et al., "A broadband millimeter-wave dual polarized phased array for radar front end applications," *2005 IEEE MTT-S International Microwave Symposium Digest*, pp. 387-390 (Jun. 2005).

Schulwitz et al., "A compact dual polarized multibeam phased array architecture for millimeter-wave radar," *IEEE Transactions on Microwave Theory and Techniques*, vol. 53, No. 11, pp. 3588-3594 (Nov. 2005).

Schulwitz et al., "A new low loss Rotman lens design for multibeam phased arrays," *2006 IEEE MTT-S International Microwave Symposium Digest* (Jun. 2006).

Schulwitz et al., "Millimeter-wave dual polarized L-shaped horn antenna for wide-angle phased arrays," *IEEE Transactions on Antennas and Propagation*, vol. 54, No. 9, pp. 2663-2668 (Sep. 2006).

Shen et al., "The hexagonal horn as an efficient Gaussian beam launcher," *IEEE Trans. Antennas Propagat.*, vol. 45, pp. 1173-1178 (1997).

Singhal et al., "An overview of design and analysis techniques of Rotman type multiple beam forming lens and some performance results," *IE(I) Journal*, vol. 84, pp. 52-58 (2004).

Swaminathan et al., "Computation of cutoff wavenumbers of TE and TM modes in waveguides of arbitrary cross sections using a surface integral formulation," *IEEE Transactions on Microwave Theory and Techniques*, vol. 38, No. 2, pp. 154-159 (1990).

* cited by examiner

PHASED ARRAY SYSTEMS AND PHASED ARRAY FRONT-END DEVICES

STATEMENT REGARDING FEDERALLY SPONSORED RESEARCH OR DEVELOPMENT

This invention was made with government support under Contract No. RP6897 awarded by the Army Research Laboratory. The government has certain rights in the invention.

BACKGROUND OF THE DISCLOSURE

1. Field of the Disclosure

The disclosure relates generally to phased array radar and communication systems and, more particularly, to RF (radio frequency) front-end structures and devices for such systems.

2. Brief Description of Related Technology

Recent advances in radar imaging and sensor systems have led to demands for compact, low cost, and robust phased array front ends. For example, radars for automotive adaptive cruise control (ACC) systems involve phased arrays detecting targets up to a range of 150 meters while maintaining a cost affordable to consumers. In addition, smart antennas with multiple beam forming capabilities should also achieve satisfactory link quality and reliability. Unfortunately, high performance phased array systems have typically been limited by the inherent complexity and bulkiness arising from the additional circuitry and hardware needed to achieve multiple performance functions and capabilities in a single, complete system. In modern radar systems, desirable capabilities include rapid beam scanning, transmit and receive functions at multiple simultaneous scan angles, and target distinction based on polarization signatures. Further, to achieve superior resolution and range, it is desirable to maintain a broad bandwidth with minimal losses throughout the entire system. Still further, the growing focus toward imaging radar systems and high data rate communication systems is pushing the frequency range for next generation phased array systems well into the millimeter-wave range and beyond. As a result, the production of radar systems addressing such functionality often amounts to a challenge met at the price of increased size, weight and cost.

In the past several years, a variety of new techniques have been introduced with the aim of realizing practical phased array architectures suitable for automotive collision avoidance radar, remote sensing, tactile missile, and communication applications. Multifunctional, one-dimensional multibeam phased arrays have been demonstrated, where beam control is obtained by implementing phase shifter or signal processing components as part of a hybrid circuit. To improve the overall gain and performance of the system, two-dimensional arrays have been formed. See, for example, the quasi-optical techniques described in Popovic et al., "Multibeam antennas with polarization and angle diversity," *IEEE Trans. Antennas Propagat.*, vol. 50, no. 5, pp. 651-657 (2002); and, Granholm et al., "Dual polarization stacked microstrip patch antenna array with very low cross-polarization," *IEEE Trans. Antennas Propagat.*, vol. 49, no. 10, pp. 1393-1402 (2001). However, to obtain electronically controlled multibeam steering with independent polarization control, additional circuitry and hardware are needed, which may lead to adverse design constraints on the system, such as increased adjacent antenna element spacing, or excessive power dissipation and heat due to tight dimensional limitations of the circuit layout.

Achieving a constant progressive phase shift between adjacent antennas over a wide bandwidth is also a significant challenge at millimeter-wave frequencies. A true time delay (TTD) approach has been used in past solutions involving, for instance, microelectromechanical system (MEMS) phase shifters, multi-line phase shifters, photonic control, and Rotman lens implementations. See, for example, Metz, et al., "Fully integrated automotive radar sensor with versatile resolution," *IEEE Trans. Microwave Theory & Tech.*, vol. 49, no 12, pp. 2560-2566 (2001); Russell, et al., "Millimeter-wave radar sensor for automotive intelligent cruise control," *IEEE Trans. Microwave Theory & Tech.*, vol. 45, no. 12, pp. 2444-2453 (1997); and, Chio et al., "A Rotman lens fed ridge-element multibeam array demonstrator," *IEEE AP-S Int. Symp. Dig.*, vol. 1, pp. 655-658 (1994).

Of these approaches, the Rotman lens has been used to achieve low cost, reliable, multibeam phased arrays. See, for example, Archer, "Lens-fed multiple beam arrays," *Microwave J.*, pp. 171-195 (1984). However, the Rotman lens is not an efficient power dividing component because losses of nearly 3 dB may be attributed to the non-perfect focusing of the rays within the lens. In the ideal situation, all power emanating from a particular beam port would be divided and coupled to each array port. However, in reality, a substantial amount of power is distributed throughout the lens and not focused upon the array ports. Substantial power losses, in fact, occur via the sides of the Rotman lens, which have been terminated to reduce unwanted reflections and minimize phase errors at the array ports.

Dual polarized phased arrays are becoming increasingly popular for identifying targets with various polarization signatures. Polarimetric radar systems extract both the amplitude and phase information to correctly characterize the position and polarization signature of such targets. This information is obtained through the independent processing of two orthogonal polarizations. In addition, communication systems can effectively double the bandwidth of the transmitted and received signals by taking advantage of polarization diversity.

One of the major components that has limited the performance of polarimetric radar systems is the antenna and its corresponding feeding system. For instance, slot antennas have been difficult to implement in a compact dual polarized array configuration, and horn antennas have required additional hardware, such as an orthomode transducer (OMT) or orthogonal coupling elements to achieve the desired dual polarized functionality. See, for example, Ali-Ahmed, et al., "92 GHz dual-polarized integrated horn antennas," *IEEE Trans. Antennas Propagat.*, vol. 39, no. 6, pp. 820-825 (1991).

Other common approaches, such as the use of patch antennas, have resulted in an inherently narrow bandwidth. For example, one past design involved passive microstrip circuitry feeding an array of perpendicular aperture coupled microstrip feeds, which then excite an array of dual polarized patch antennas. See Al-Zayed, et al., "A dual polarized millimeter-wave multibeam phased array," IEEE MTT-S Int. Microwave Symp. Dig., vol. 1, pp. 87-90 (2004). The combination of microstrip-based components and patch antennas helped form a tray architecture with a low profile suitable for stacking to form a two-dimensional phased array. However, the antenna array and feeding structure limited the system bandwidth to 2% for 32.2 to 32.9 GHz operation along with 13 dB cross-polarization radiation. See also Metz, et al. (cited above), and Ortiz, et al., "A Ka-band perpendicularly-fed

SUMMARY OF THE DISCLOSURE

In accordance with one aspect of the disclosure, a front-end device is useful for a phased array system. The front-end device includes an array of horn antennas, a first set of transmission lines coupled to the horn antenna array for a first polarization, a second set of transmission lines coupled to the horn antenna array for a second polarization orthogonal to the first polarization, and a plurality of L-shaped excitation elements. Each L-shaped excitation element of the plurality of L-shaped excitation elements couples a transmission line from each of the first and second sets of transmission lines to a respective horn antenna of the horn antenna array.

In some cases, each horn antenna of the array includes an L-shaped horn to accommodate the first and second polarizations. Alternatively, each horn antenna of the array includes a rectangular horn to accommodate the first and second polarizations.

Each transmission line in the second set of transmission lines may include a waveguide twist to effect a transition between the first polarization and the second polarization. The waveguide twist may then include a step-twist junction.

In some embodiments, the front-end device further includes a housing structure that defines the array of horn antennas, the first and second sets of transmission lines, and the plurality of L-shaped excitation elements. The first and second sets of transmission lines may include corresponding first and second sets of waveguide feeds.

The front-end device may further include first and second phase-shifting networks coupled to the first and second sets of transmission lines, respectively, for separate handling of the first and second polarizations. The first and second phase-shifting networks may include a respective microstrip-based Rotman lens, and each transmission line of the first and second sets of transmission lines may include a microstrip-to-waveguide transition for coupling to the respective Rotman lens. Alternatively or additionally, the first and second phase-shifting networks may include a respective microstrip-based Rotman lens having a varying permittivity for enhanced focusing. In such cases, each Rotman lens may include first and second dielectric substrate regions having differing distributions of holes to effect the varying permittivity. The front-end device may still further include a phase element coupled to one of the first and second phase-shifting networks such that the first and second polarizations combine to implement a circular or elliptical polarization scheme.

In some cases, one of the first and second sets of transmission lines may include a plurality of meander lines in which a first half of the plurality of meander lines introduce a 180-degree phase difference relative to a second half of the plurality of meander lines.

In some embodiments, each L-shaped excitation element of the plurality of excitation elements includes an L-shaped transition waveguide.

In accordance with another aspect of the disclosure, a front-end device for a phased array system includes an antenna array and a phase-shifting network to couple the antenna array to the phased array system. The phase-shifting network includes a Rotman lens having a plurality of beam ports and a plurality of array ports, and signals passing between one or more of the plurality of beam ports and one or more of the plurality of array ports encounter a varying material property within the Rotman lens.

In some embodiments, the material property is permittivity such that a permittivity variation enhances focusing within the Rotman lens. The Rotman lens may include a microstrip and a substrate on which the microstrip is disposed. In such cases, the substrate may include a hole distribution to effect the permittivity variation. The hole distribution may include a lattice of holes filled with a number of dielectric materials. Alternatively or additionally, the Rotman lens includes a housing defining a cavity through which the signals pass, where the cavity is filled with a number of dielectric materials to effect the permittivity variation. The Rotman lens may alternatively or additionally include a plurality of regions, each of which has a different permittivity to effect the permittivity variation. The plurality of regions are wedge-shaped in some cases. In other cases, the Rotman lens includes a dielectric component having a continuously varying dielectric constant, such that the permittivity variation has a continuous gradient.

In accordance with yet another aspect of the disclosure, a three-dimensional phased array system includes a plurality of phase-shifting networks, and a plurality of antenna housing structures arranged in a stacked configuration. Each antenna housing structure includes a respective array of horn antennas and respective first and second sets of orthogonal waveguide feeds, and each set of the first and second sets of orthogonal waveguide feeds is coupled to a respective phase-shifting network of the plurality of phase-shifting networks. Each horn antenna is coupled to both of the first and second sets of orthogonal waveguide feeds such that each horn antenna is dual-polarized, and each waveguide feed includes an L-shaped excitation element to support each dual-polarized horn antenna.

In some cases, each phase-shifting network of the plurality of phase-shifting networks includes a Rotman lens such that each horn antenna array is coupled to a respective pair of Rotman lenses. Additionally, each respective pair of Rotman lenses may be disposed on opposite sides of a respective tray-based arrangement.

Each orthogonal waveguide feed structure in the first set of orthogonal waveguide feed structures may include a waveguide twist.

Each phase-shifting network of the plurality of phase-shifting networks may include a microstrip-based Rotman lens. In such cases, signals passing through each microstrip-based Rotman lens may encounter a permittivity variation.

In accordance with still another aspect of the disclosure, a phased array system for use in a monopulse radar scheme includes an array of antennas, a Rotman lens having a plurality of array ports, where each array port of the plurality of array ports is coupled to a corresponding antenna of the array of antennas. A first set of meander lines couples a first half of the plurality of array ports to the corresponding antennas, and a second set of meander lines couples a second half of the plurality of array ports to the corresponding antennas. The meander lines of the first set of meander lines differ from the meander lines of the second set of meander lines to introduce a 180-degree phase difference to support the monopulse radar scheme.

In some embodiments, the Rotman lens and the first and second sets of meander lines are components of a first front-end circuit. The phased array system may include a second front-end circuit having a further Rotman lens coupled to a plurality of path-length consistent meander lines. The first and second front-end circuits may then share the array of antennas as a common antenna array. Alternatively or additionally, the Rotman lens of the first front-end circuit and the further Rotman lens of the second front-end circuit may be disposed on opposite sides of a tray-based arrangement.

BRIEF DESCRIPTION OF THE DRAWING FIGURES

For a more complete understanding of the disclosure, reference should be made to the following detailed description and accompanying drawing figures, in which like reference numerals identify like elements in the figures, and in which.

Figure 1:
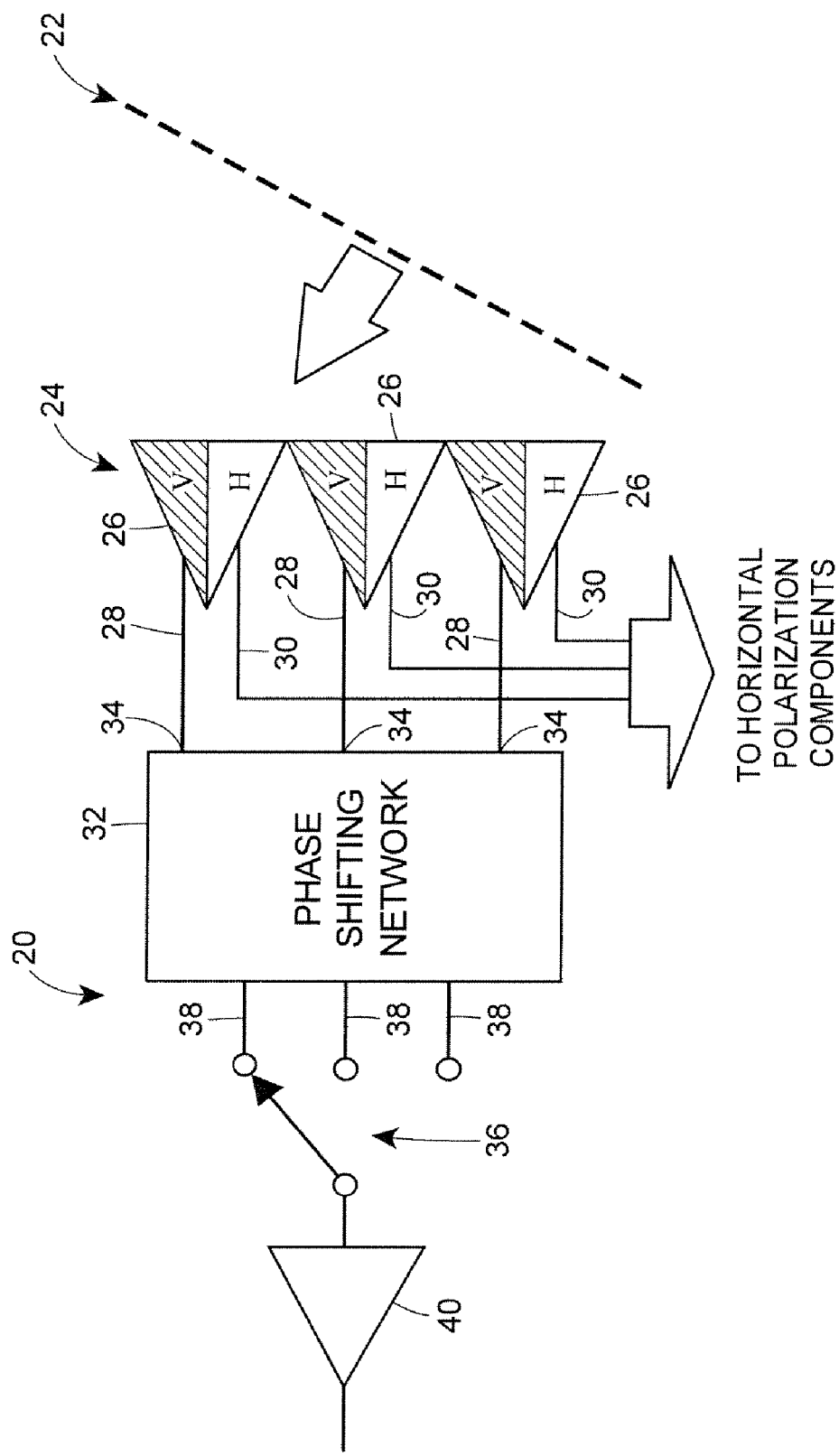
FIG. 1 is a schematic representation of a dual-polarized phased array system with a front-end architecture configured in accordance with one aspect of the disclosure.
Figure 4:
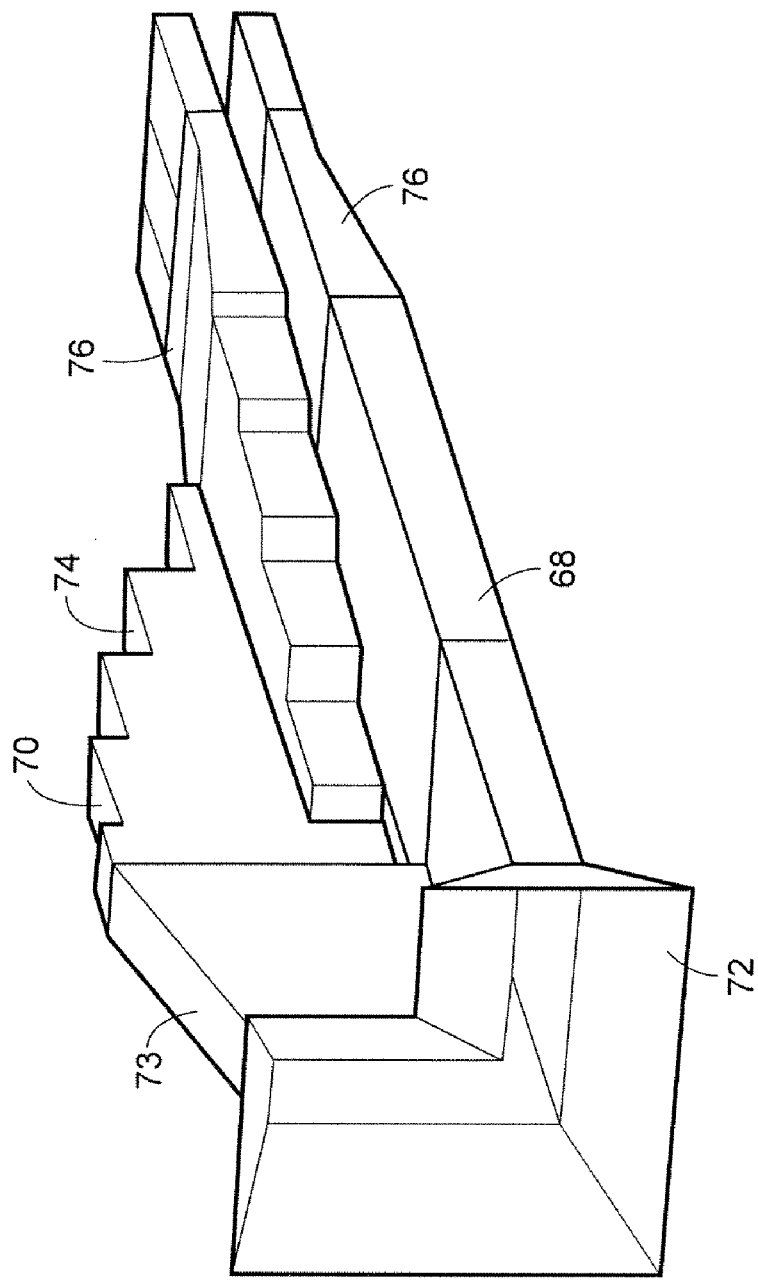
FIG. 4 is a schematic, perspective representation of a dual-polarized horn antenna and accompanying waveguide feeds of the tray-based front-end devices of FIGS. 2 and 3 in accordance with one aspect of the disclosure.
Figure 5:
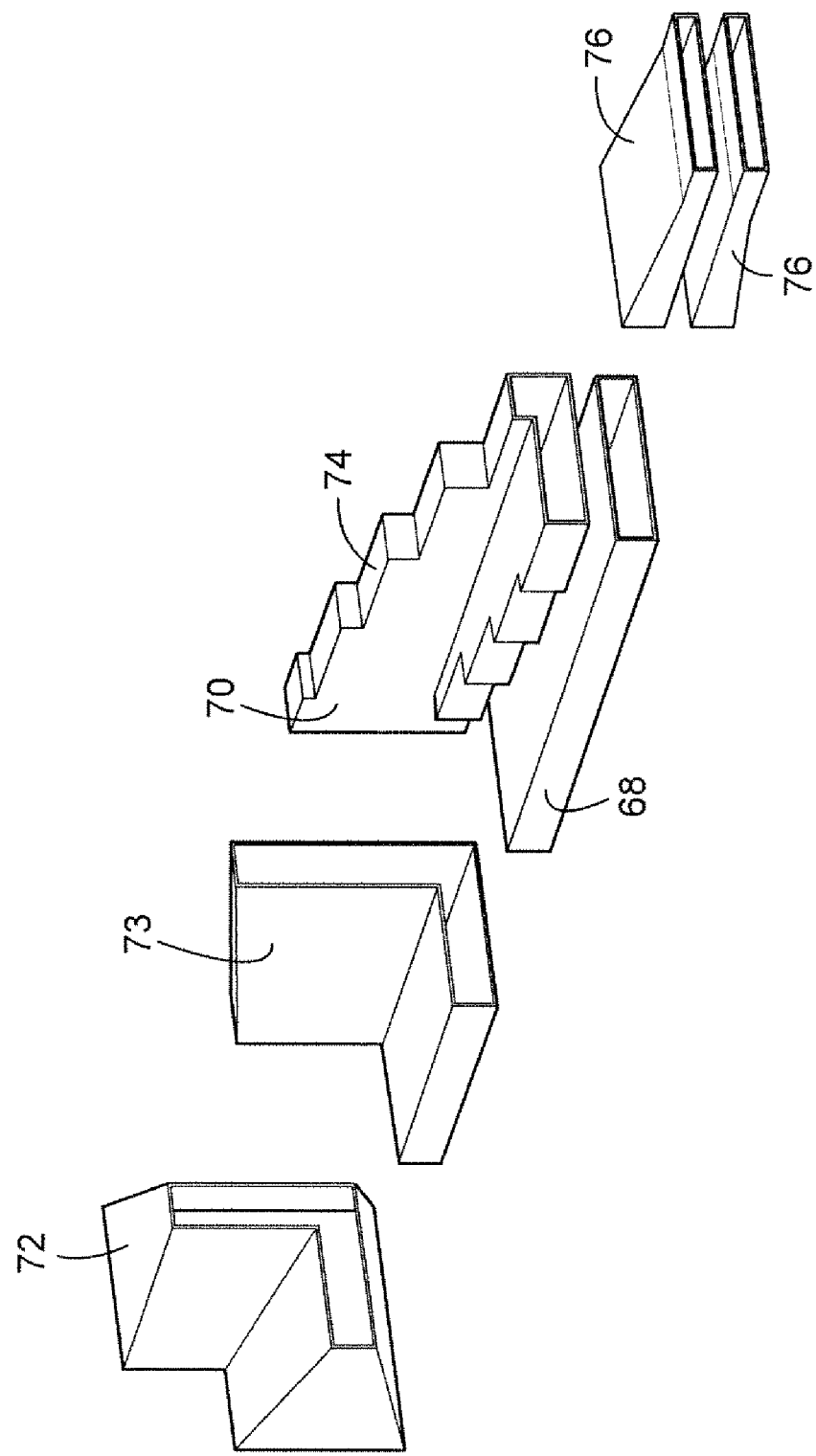
FIG. 5 is a schematic, exploded, and perspective view of the dual-polarized horn antenna and accompanying waveguide feeds of FIG. 4.
Figure 6:
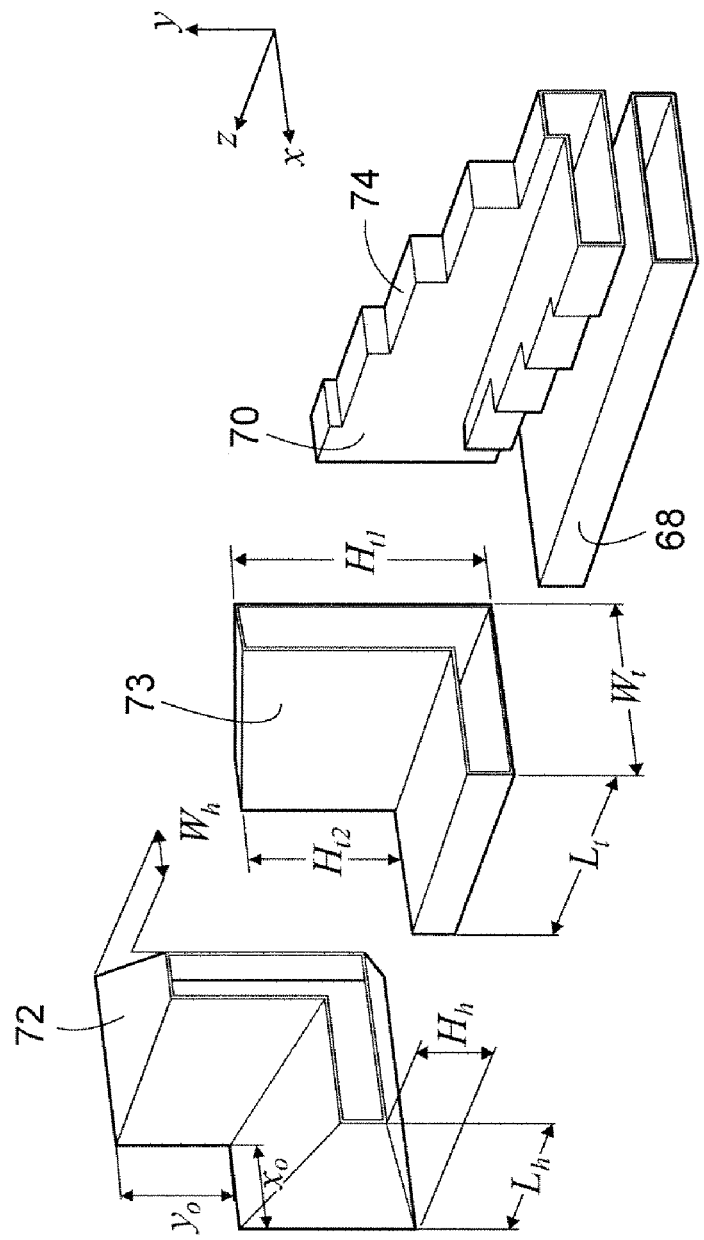
FIG. 6 is a further exploded view of the dual-polarized horn antenna and accompanying waveguide feeds of FIGS. 4 and 5 in connection with dimensional parameter definitions.
Figure 7A:
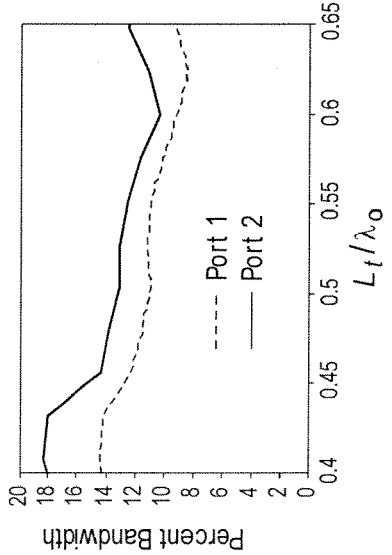
Figure 7B:
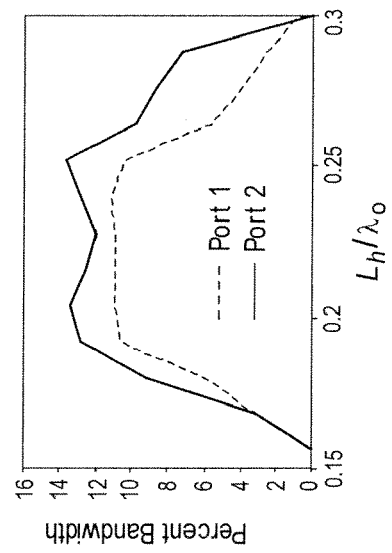
Figure 7C:
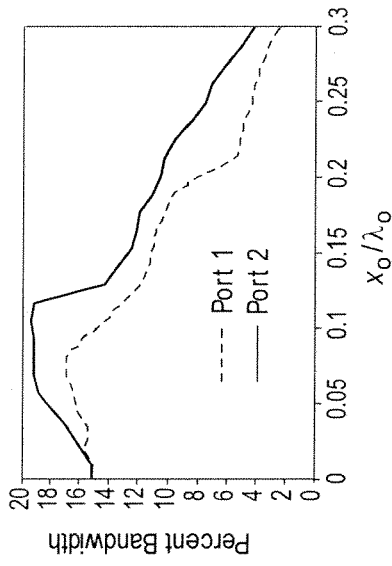
Figure 8A:
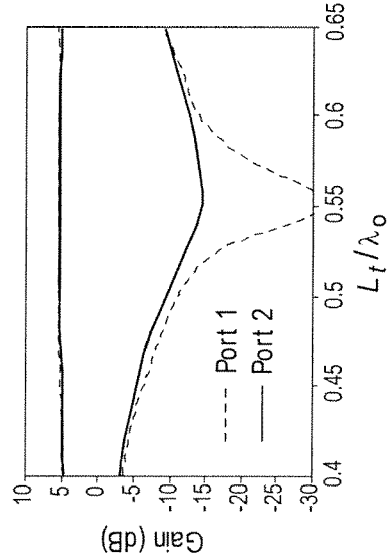
Figure 8B:
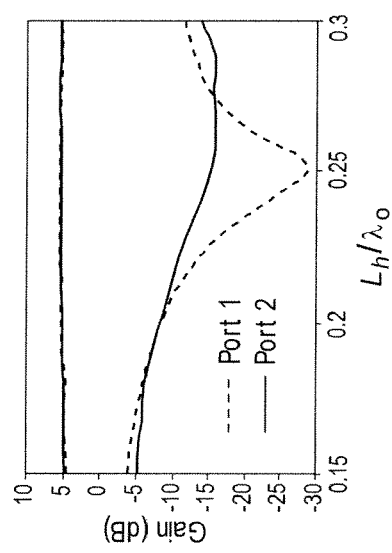
Figure 8C:
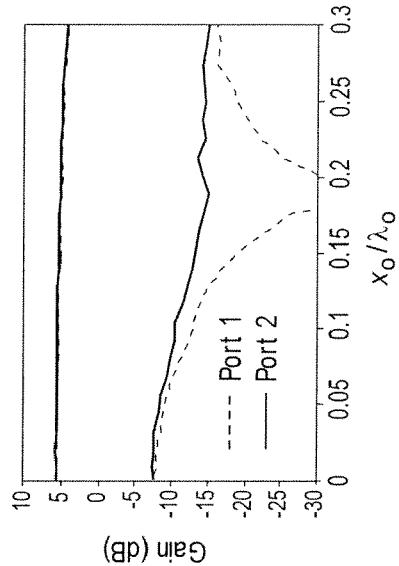
Figure 9:
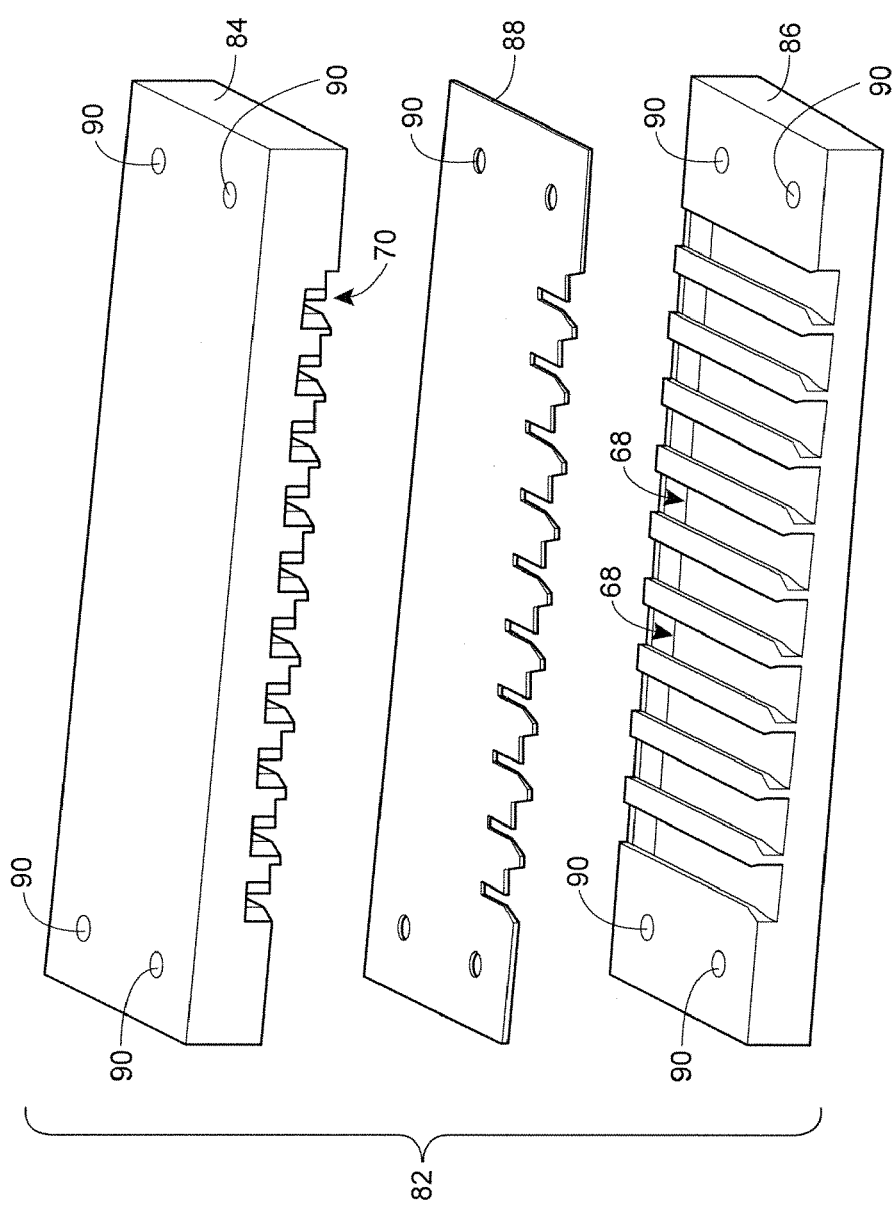
Figure 10:
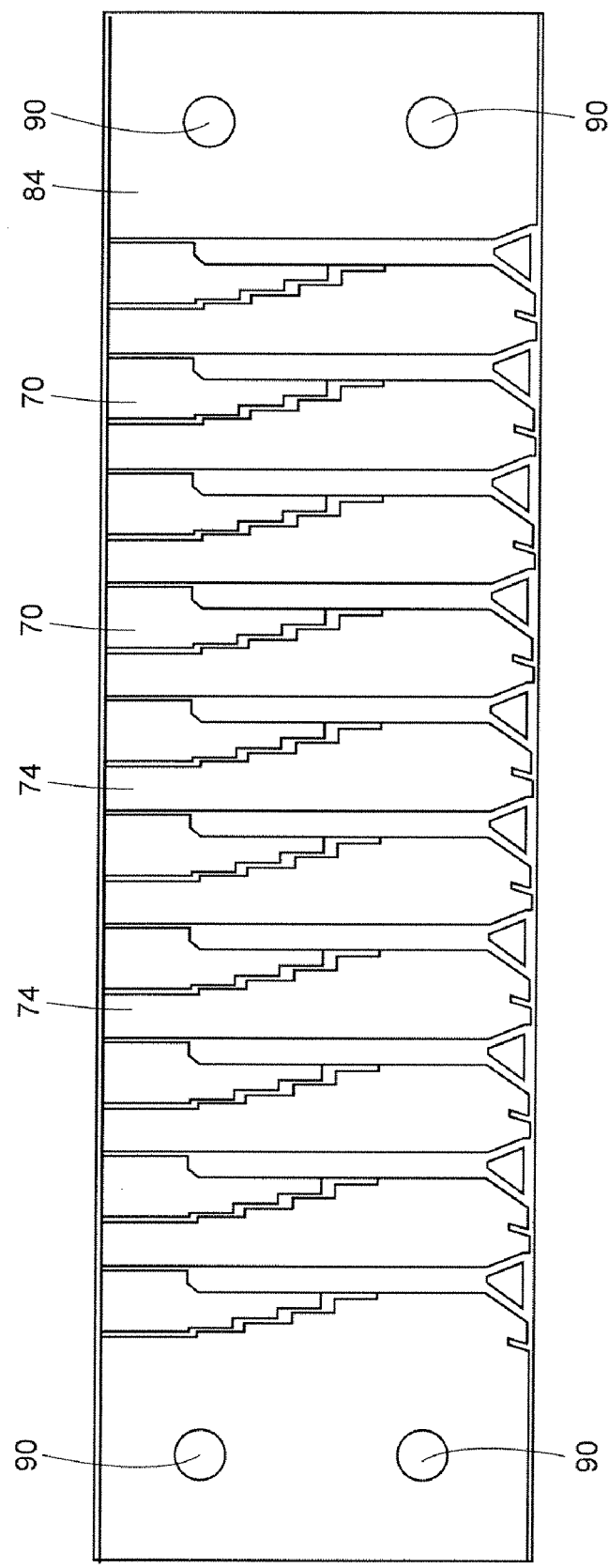
Figure 11:
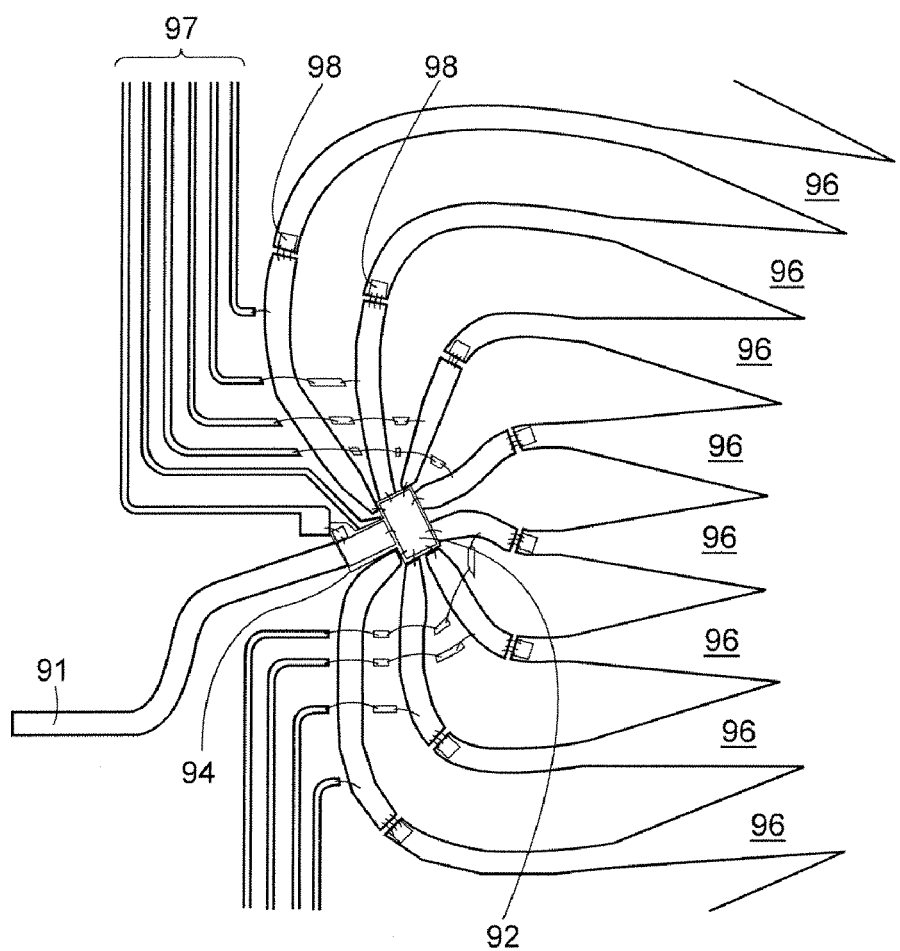
Figure 12:
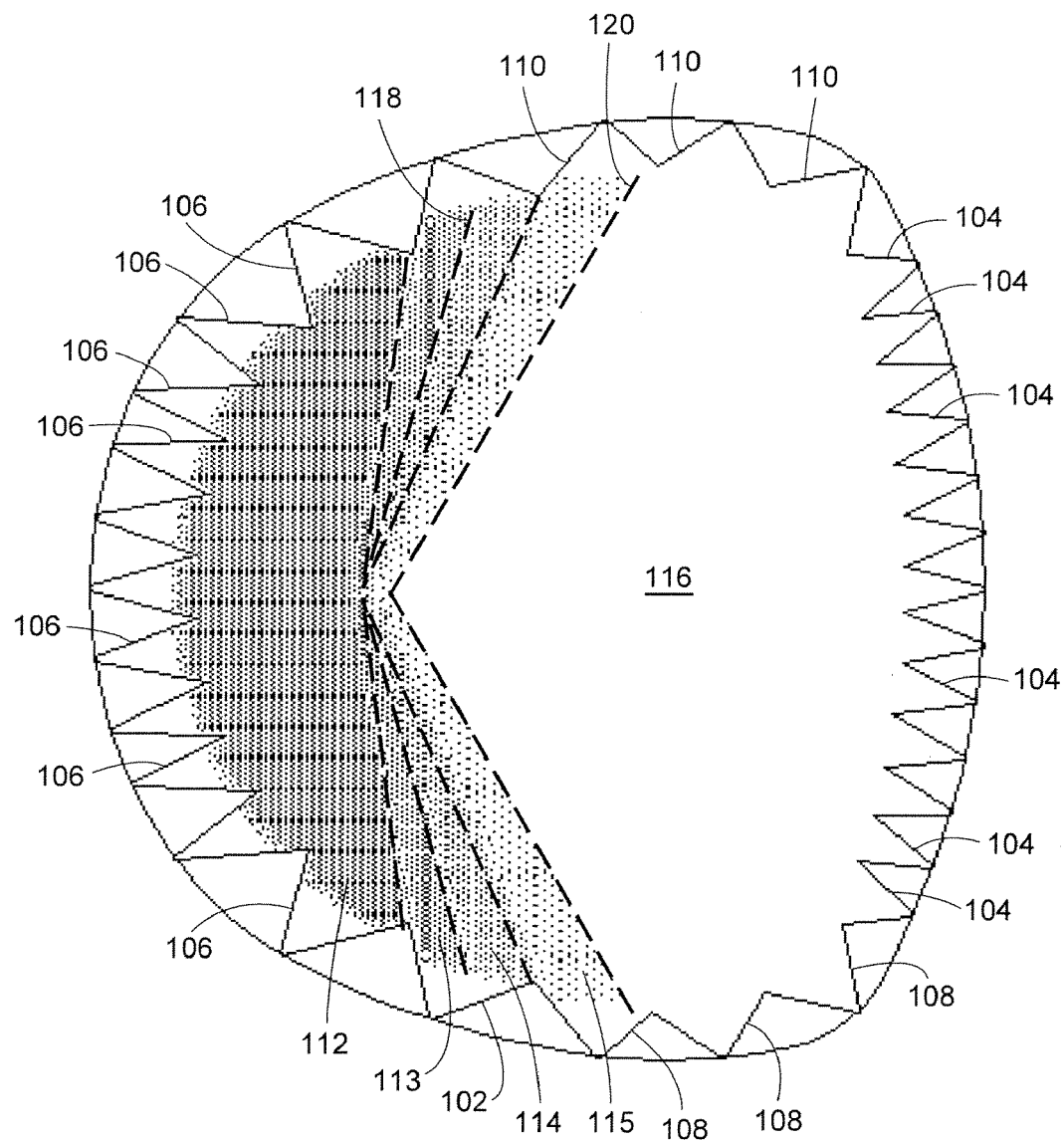
Figure 13:
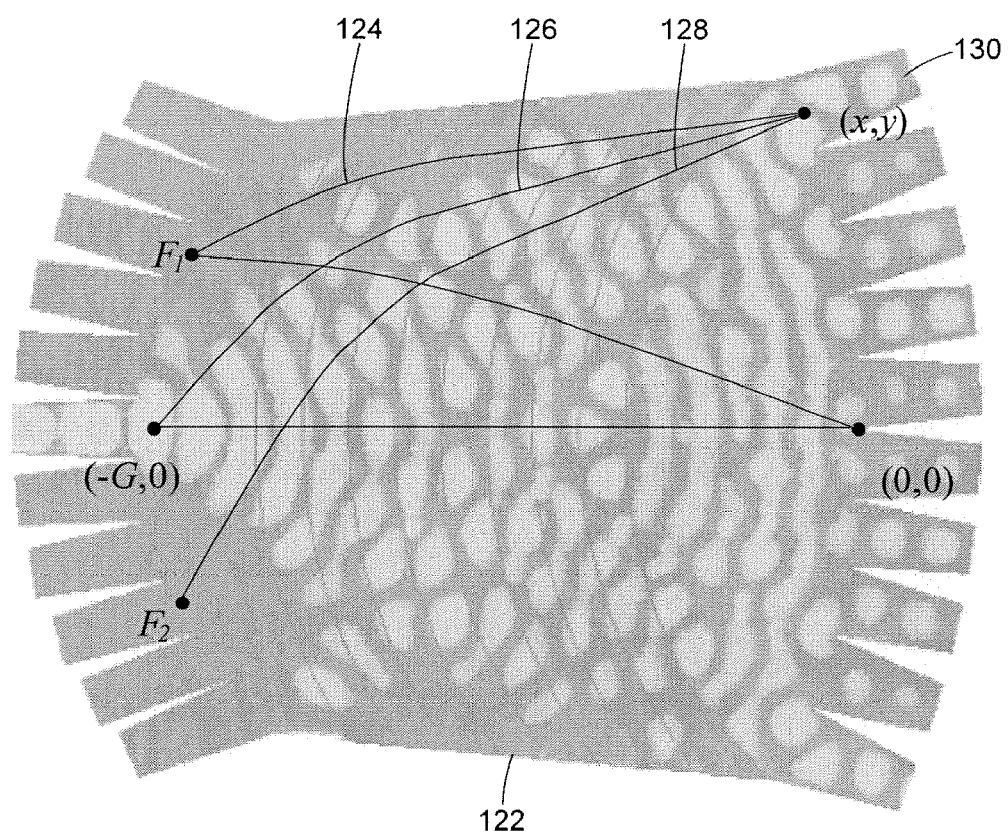
Figure 14:
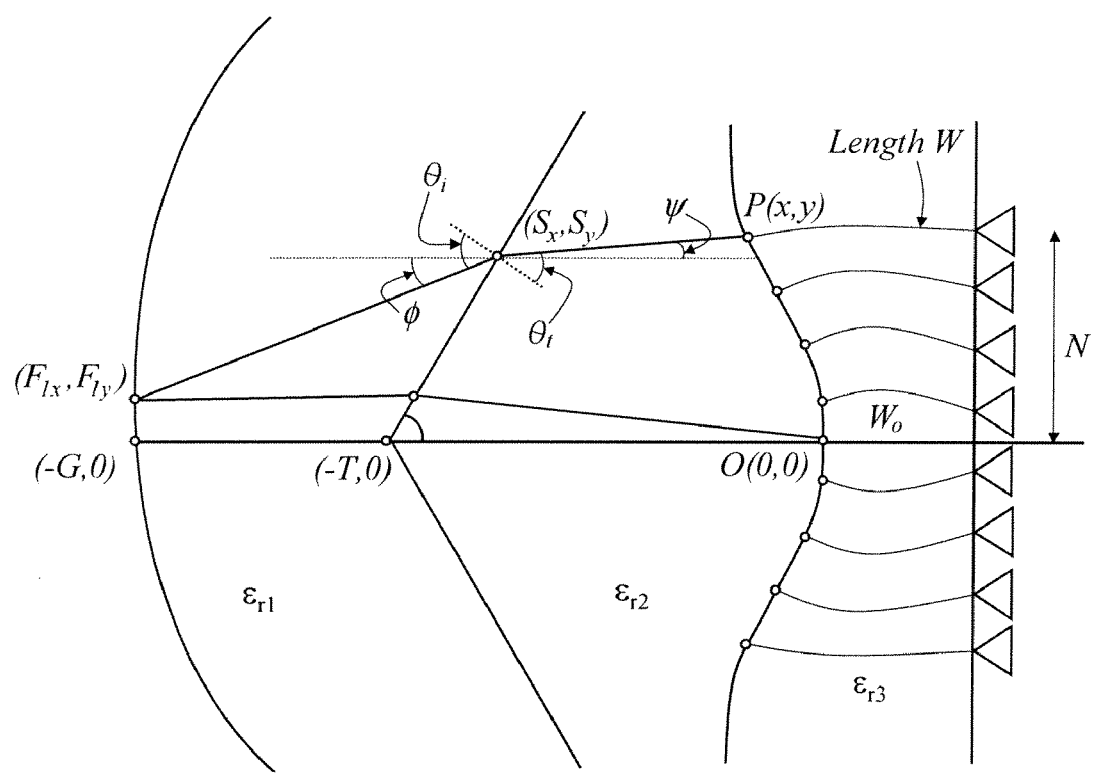
Figure 15:
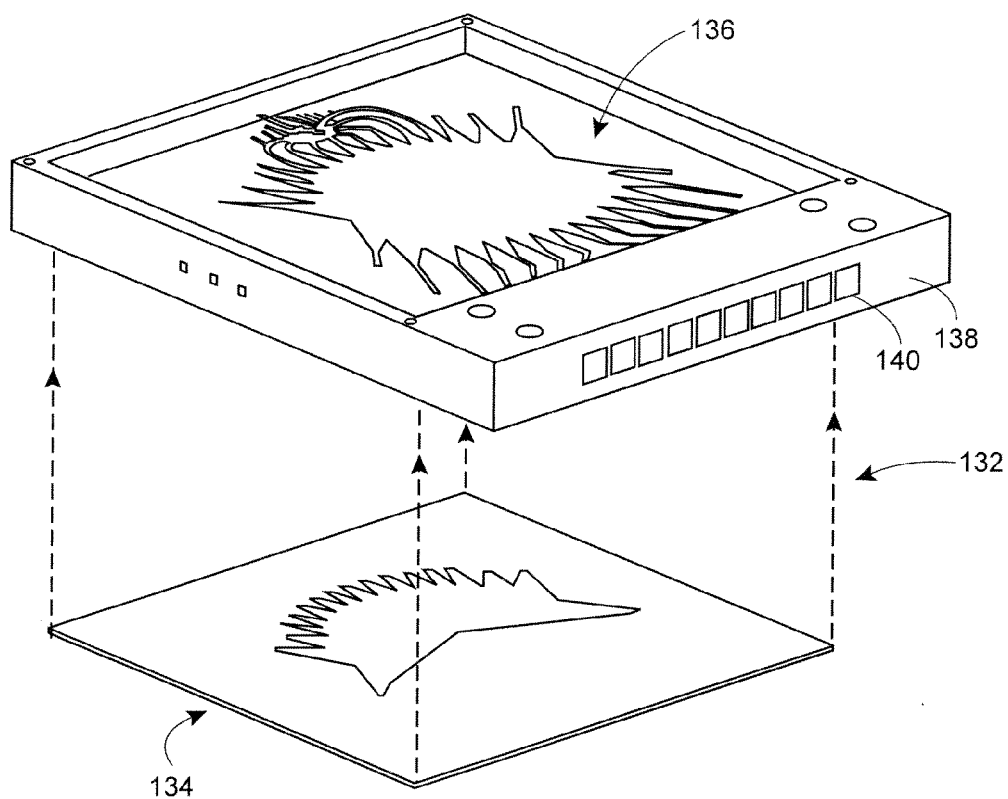
Figure 16:
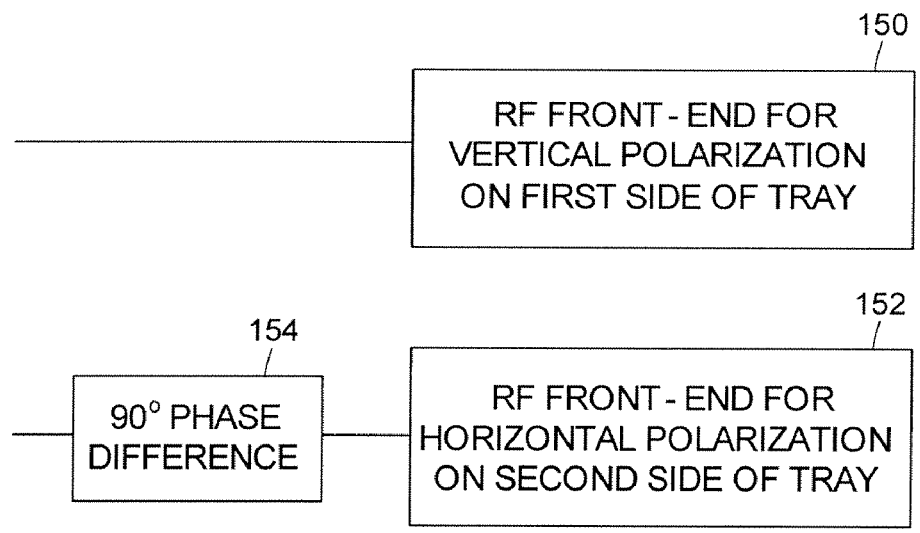
Figure 17:
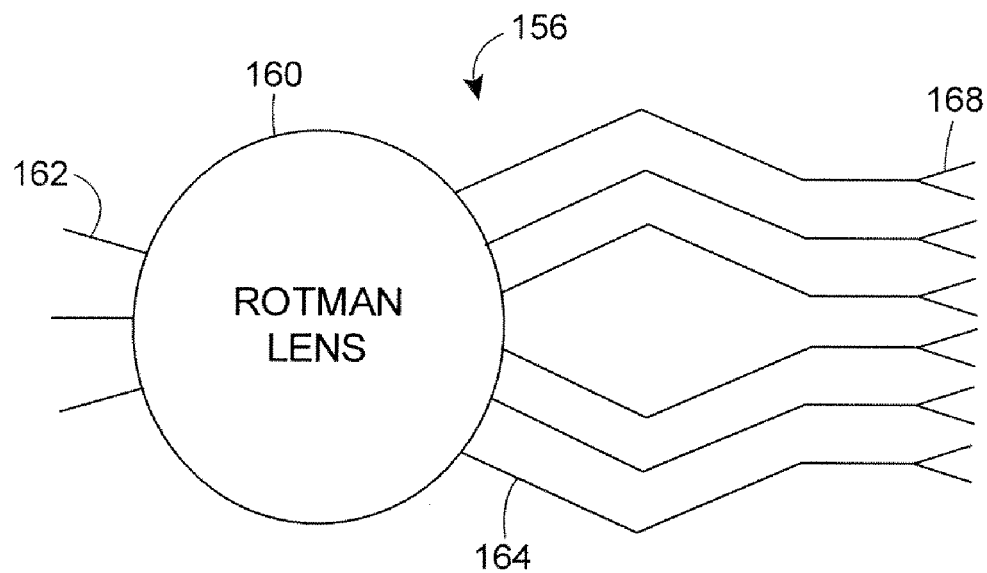
Figure 17:
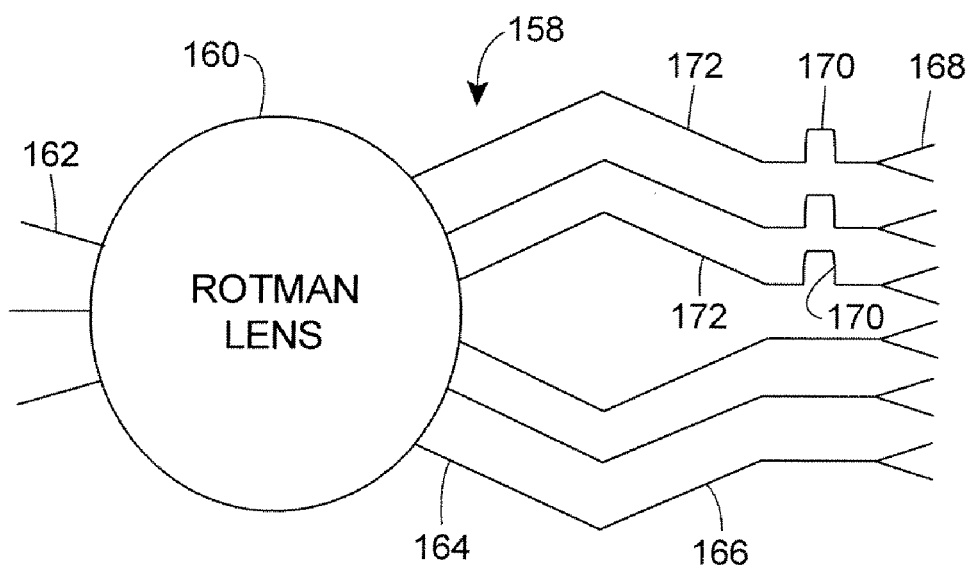

FIG. 7($a$)-7($c$) are graphical plots of simulated bandwidth of the horn antenna and accompanying waveguide feeds of FIG. 6; and, FIG. 8($a$)-8($c$) are graphical plots of simulated gain of both the co-polarized and cross-polarized radiation of the horn antenna and accompanying waveguide feeds of FIG. 6;

FIG. 9 is a schematic, exploded, perspective view of an exemplary tray-based structure that forms an array of the dual-polarized horn antennas and accompanying waveguide feeds of FIGS. 4-6;

FIG. 10 is a photographic, plan view of a tray plate of the exemplary tray architecture configured to effect polarization transitions via a series of waveguide feeds having waveguide twists in accordance with one aspect of the disclosure;

FIG. 11 is a partial, plan view of a circuit layout of a beam control module and a phase-shifting network of the phased-array system of FIG. 1 in accordance with one embodiment;

FIG. 12 is a schematic, plan view of an exemplary phase-shifting network having an enhanced focus Rotman lens in accordance with another aspect of the disclosure;

FIG. 13 is a representation of the electric field distribution and signal paths in the enhanced focus Rotman lens of FIG. 9 in accordance with one embodiment;

FIG. 14 is a representation of the signal geometry of the enhanced focus Rotman lens of FIG. 9 in accordance with one embodiment;

FIG. 15 is an exploded, perspective view of a tray-based, dual-polarized front-end device having an enhanced focus Rotman lens;

FIG. 16 is a schematic representation of phase networking circuitry in accordance with an embodiment configured for implementation of a circular or elliptical polarization scheme; and, FIG. 17 is a schematic representation of phase networking circuitry in accordance with an embodiment configured for implementation of a monopulse radar scheme.

While the disclosed devices and systems are susceptible of embodiments in various forms, there are illustrated in the drawing (and will hereafter be described) specific embodiments of the invention, with the understanding that the disclosure is intended to be illustrative, and is not intended to limit the invention to the specific embodiments described and illustrated herein.

DETAILED DESCRIPTION OF PREFERRED EMBODIMENTS

Disclosed herein are low profile phased array front end systems and devices configured to support independent control and characterization of the vertical and horizontal polarized beams in azimuth and elevation. In contrast to prior efforts, the low profile tray architecture disclosed herein may be implemented without undesirable increases in antenna element spacing, while also maintaining the multiple functions and capabilities demanded of modern day radar systems. The low profile tray architecture is also easily implemented in multiple linear array embodiments.

The systems and devices described herein are ideally suited for applications such as imaging systems, automotive collision avoidance radar, remote sensing, and communication systems. Nonetheless, use of the disclosed systems, structures, and devices is not limited to the applications referenced herein. On the contrary, the disclosed systems, structures and devices are well suited for any number of contexts and applications involving, for instance, any type of radio frequency (RF) radiation, including, for instance, the microwave bands, such as the Ka and millimeter bands. That is, the disclosed systems, structures and devices may be configured for operation or application in any one or more desired RF frequency bands, in both broadband applications and narrowband applications (e.g., narrowband CW radar).

The disclosed devices and systems may be utilized in applications involving MMIC (monolithic microwave integrated circuit) technologies for the Ka band to realize a very compact and broadband phased array front end. As described below, embodiments may be based on a tray-based architecture, where the low profile nature of the trays allows multiple trays to be stacked upon each other to form a two-dimensional phased array. In these cases, each individually assembled tray may form a low-profile one-dimensional phased array, allowing for electronic scanning of the radiated beam in one plane, for example the azimuth plane. By stacking several trays upon each other, and by processing the phase differences between each tray, electronic scanning of the radiated beam in the other plane, for example the elevation plane, is achieved. In this way, a compact three-dimensional imaging system may be realized.

In accordance with one aspect of the disclosure, a dual polarized front-end device includes a double-sided, tray-based waveguide structure that feeds an array of miniature horn antennas, forming a compact single aperture element. The waveguide structure may be configured for operation at millimeter-wave frequencies via stereolithographic fabrication techniques capable of forming three-dimensional structures with small shapes and complex angles. In some cases, the stereolithographic techniques may involve a layer-by-layer fabrication process to form, for example, rigid polymer structures with near vertical sidewalls and tolerances within a thousandth of an inch. The structures may then be electroplated with metal to form double-sided trays for definition of separate sets of waveguide feeds dedicated to supporting control of multiple (e.g., orthogonal) polarizations.

Notwithstanding the advantages of stereolithography, the front-end devices and structures described below may be fabricated using other techniques, such as computer numerically controlled (CNC) machining, silicon micromachining, and fabrication with low temperature co-fired ceramic (LTCC) materials. As a result, the disclosed devices and systems are not limited to the fabrication techniques described herein, and a variety of fabrication techniques may be employed either alone or in combination to achieve the structures described herein.

In some embodiments, a Rotman lens serves as a robust and low-cost broadband phase shifting network for the disclosed RF front-end devices and structures. In these cases, active circuitry may be integrated with the beam ports of the Rotman lens and the lens itself may then be optimized to provide accurate phasing. In accordance with another aspect of the disclosure, some embodiments may include a Rotman lens with enhanced focusing functionality to provide the phasing with low power loss. Further details are set forth below.

With reference now to the drawing figures, FIG. 1 depicts a phased array system indicated generally at 20 having dual polarization functionality. In this exemplary case, the phased array system 20 has a front-end design with a three-element array that supports independent beam control of both the vertical and horizontal polarizations. To this end, the system 20 includes separate beam controlling circuitry for each polarization, with only the vertical polarization circuitry shown for ease in illustration. With this configuration, both amplitude and phase information of the two polarizations of an incoming signal indicated generally at 22 can be extracted or controlled. The signal 22 is received by an antenna array indicated generally at 24 of miniature dual polarized horn elements 26, where the signals from the two polarizations at each horn 26 are coupled to two orthogonal sets of transmission lines 28, 30. Each set of transmission lines 28, 30 includes a feed structure dedicated to support one of the polarizations. To that end, the sets of transmission lines 28, 30 carry signals dedicated to the orthogonal polarizations, and may include components or sections capable of discriminating (or developing) the two polarizations received from the horn antennas through TE10 (or TE01) mode excitation. In some cases, the sets of transmissions lines 28, 30 may include sets of waveguides, although a variety of types of transmission lines may be used alone or in combination to form each transmission line of the sets 28, 30. The set of transmission lines 28 carrying the vertical polarization signals are then connected to a beam controlling network 32 dedicated to the vertical polarization via array ports 34. A separate beam controlling network (not shown) is dedicated to the horizontal polarization and coupled to the set of waveguides 30 via separate array ports (not shown).

The beam controlling (or phase-shifting) network 32 may include a Rotman lens, which sets the phase and amplitude distribution between the array 24 of horn antennas 26. The Rotman lens is robust, tolerable to extreme conditions, and capable of wide angle scanning and broadband true time delay phase shifting. Control of the beam is implemented though a broadband switch network indicated generally at 36 and coupled to the phase-shifting network 32 via beam ports 38. The switch network 36 may include multiple single-pole, multiple-through or multiple-pole, multiple through switches in a cascaded arrangement. Finally, an amplifier (e.g., a MMIC LNA) 40 is integrated with the switch network 36 to form a complete broadband switching module.

FIG. 1 generally depicts device elements involved during signal reception, i.e., incorporated on the receive side, such as the amplifier 40. The disclosed devices and structures, however, are equally suited for implementation of the transmit side, where, for instance, signal amplification may occur before or after the phase shifting network 32. In the latter case, power amplifiers may be disposed in-line with any of the transmission lines between the phase shifting network 32 and the antenna elements 26. More generally, both transmit and receive functionality may be implemented simultaneously with the disclosed devices and structures by routing the transmission lines accordingly.

Figure 2:
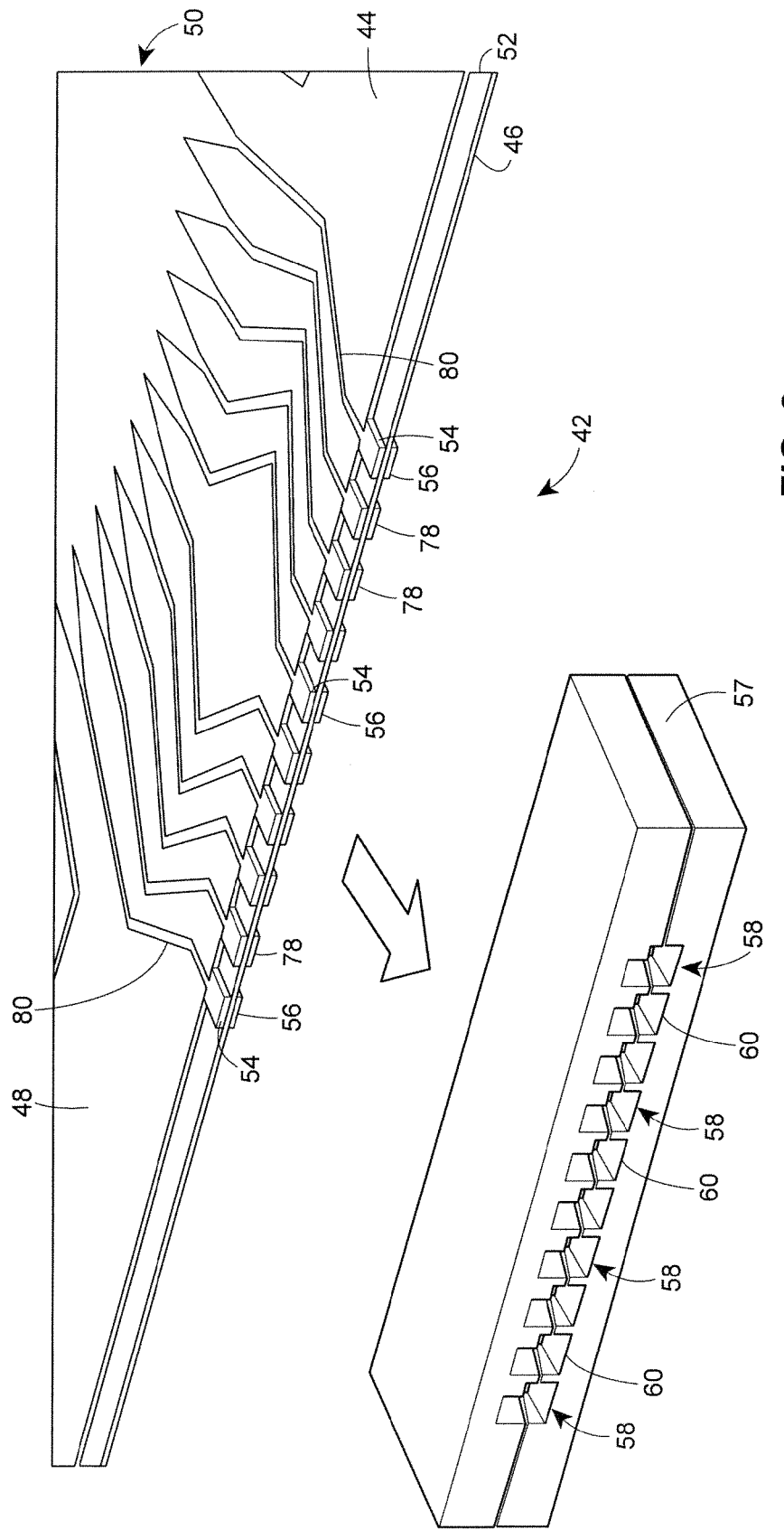
FIG. 2 is a partial, exploded and perspective view of a tray-based front-end device to implement the front-end architecture of FIG. 1 in accordance with an exemplary embodiment.

FIG. 2 depicts an exemplary front-end design that presents the phase-shifting and other components of the front-end device 20 in a low-profile configuration. To this end, the front-end components are housed in a tray-based architecture that, generally speaking, supports the placement of circuitry onto both sides of a tray indicated generally at 42 in a double-sided configuration. Therefore, the tray 42 includes two sets of identical low-profile circuits configured to achieve the phase shifting and amplification of the signals of the two orthogonal polarizations. In this embodiment, the circuits are disposed on opposite sides 44, 46 of a substrate 48 (e.g., TMM3), and include a microstrip-based Rotman lens indicated generally at 50, the switch 36 (FIG. 1), and the amplifier circuitry 40 (FIG. 1). The circuitry on the top side 44 of the tray 42 may be used to condition the signals for the vertical polarization, while the circuitry (not shown) on the bottom side 46 may be used for the horizontal polarization.

A significant advantage of this implementation is the fact that a common ground plane 52 may be used for the tray 42. This architecture supports the implementation of double-sided trays (i.e., circuitry on both sides of the tray), thus essentially doubling the amount of circuitry that can fit into the phased array. Through the use of, for example, PIN diode switches for the switch 36 and a microstrip-based Rotman lens 50, multibeam steering may also be achieved, where signals from the desired beam ports 38 (FIG. 1) of the Rotman lens 50 are chosen through the proper biasing of the PIN diodes.

FIG. 2 also depicts array ports 54 of the Rotman lens 50 for the vertical polarization, and array ports 56 for the horizontal polarization. The array ports 56 are connected to another Rotman lens (not shown) dedicated to the horizontal polarization and disposed on the bottom side 46 of the tray 42. The array ports 54, 56 are connected to two arrays of broadband dielectrically filled waveguide feeds (not shown) disposed in a housing 57 and designed for discrimination of vertical and horizontal polarization signals received via a corresponding array of dual-polarized horn antennas indicated generally at 58. In the exemplary embodiment of FIG. 2, the array includes ten horn antennas 58, each of which is coupled to the array ports 54, 56 of the two Rotman lenses via corresponding waveguides of the waveguide feeds.

The use of a single aperture to receive (or transmit) both the vertical and horizontal polarizations helps to maintain close element spacing while achieving sufficient gain, bandwidth, and compactness. To this end, each antenna 58 includes an L-shaped horn outlet 60, although, in some embodiments, a rectangular-shaped horn outlet may be used instead.

Figure 3:
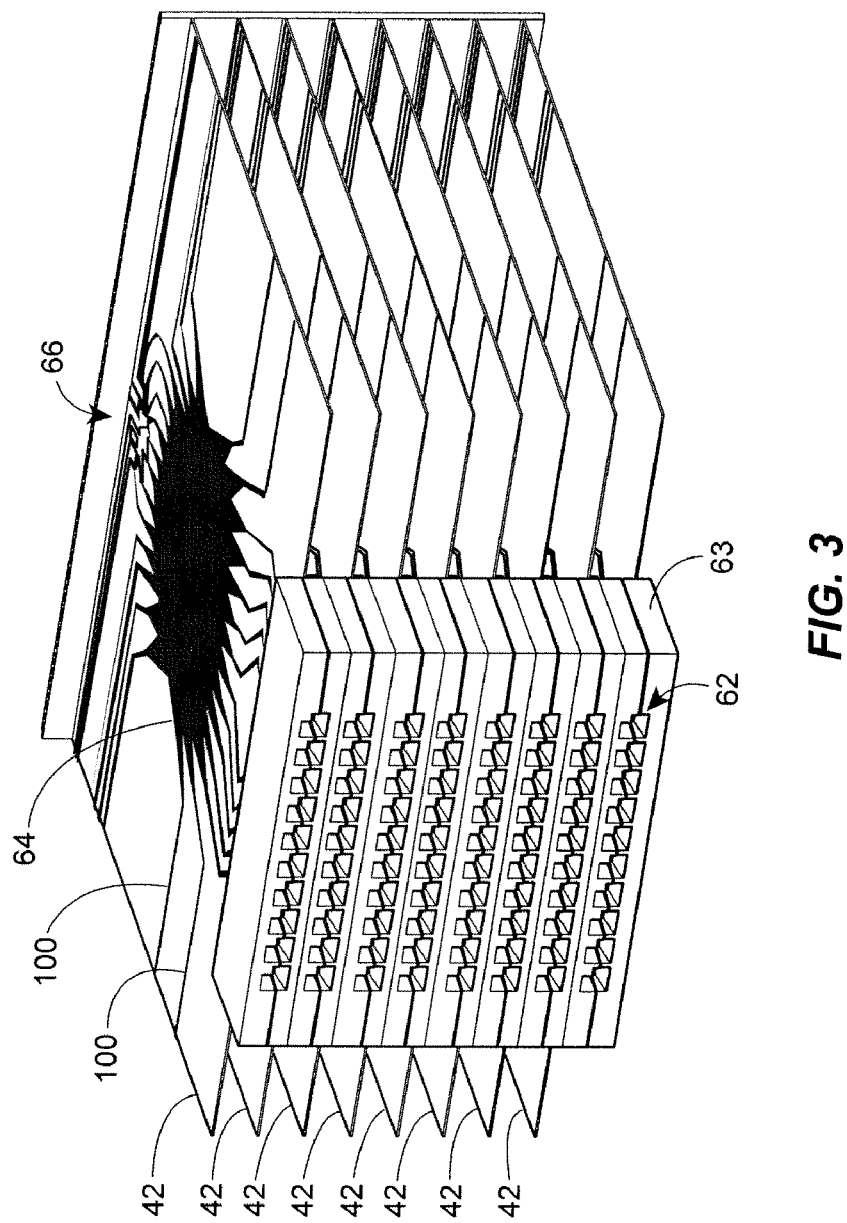
FIG. 3 is a perspective representation of a two-dimensional, dual-polarized phased array system in which a stack of the tray-based front-end devices of FIG. 2 are arranged in accordance with an exemplary embodiment.

As depicted in the exemplary embodiment of FIG. 3, multiple (e.g., eight) trays 42 of one-dimensional phased arrays may be disposed in a stacked arrangement to form a complete two-dimensional phased array system. This embodiment exhibits the ease with which the trays 42 may be stacked upon each other as a result of the low-profile nature of the tray-based architecture. Each tray 42 may include a horn antenna array indicated generally at 62, and orthogonal waveguide feeds (not shown), disposed in a housing 63, two microstrip Rotman lenses (only an upper lens 64 is shown), and a beam control module indicated generally at 66.

Further details regarding the miniature horn antennas and corresponding waveguide feeds are now set forth in connection with FIGS. 4-6, 7(*a*)-(*c*), and 8(*a*)-(*c*). Generally speaking, two orthogonally disposed waveguides 68, 70 feed a single L-shaped horn antenna 72 via an associated L-shaped excitation element, such as an L-shaped feed waveguide 73. In this way, two waveguides 68, 70 are used for each antenna element 72 to separately receive the vertical and horizontal polarization signals from each dual polarized horn antenna 72. To this end, one of the two waveguides 68, 70 is rotated by 90 degrees, as described below in connection with an exemplary embodiment. More generally, this implementation enables the simultaneous reception and individual beam control of the two polarizations. The waveguide feed structure described herein also enables the dual-polarized horn antenna 72 to be integrated with double-sided microstrip circuitry to maintain a low-profile, planar architecture well suited for stacked phased array configurations. The waveguides 68, 70, taken either alone or collectively with any elements between the phase-shifting network 32 and each horn antenna 72 (e.g., meander lines leading from the array ports of the Rotman lens), may form the sets of transmission lines 28, 30 (FIG. 1), or any portion thereof. Accordingly, in some embodiments, transmission line types other than waveguides may be involved or incorporated in coupling the antenna array and the phase-shifting network, including, for instance, wires or other probes. Such other transmission line types may be used in the alternative or in addition to waveguide-based feeds. Similarly, other transmission line types may also be integrated with, or part of, the L-shaped excitation element. For instance, each horn antenna may be excited by an L-shaped cavity having a pair of probes suspended in each leg of the L-shape to excite the horn antenna, which may, for example, include a flared, L-shaped cavity extending outwardly from the probes.

In some embodiments, the entire horn 72 and supporting waveguide structure is filled with a dielectric material (e.g., Emerson and Cumming HiK dielectric powder) of, for instance, permittivity $\in_r$ of about 3.0. While an alternative permittivity may be warranted in different embodiments, the dielectric filling generally further reduces the overall size of the structure and allows for a broadband transition to the microstrips on the TMM3 substrate 48 (FIG. 2), which has a similar permittivity of $\in_r=3.27$.

The design of the antenna 72 is supported by the L-shaped nature of the excitation element 73. In the embodiment shown in FIGS. 4-6, the L-shaped waveguide 73 helps achieve a higher discrimination between the co-polarized and cross-polarized signals. An exploded view of the L-shaped horn antenna 72 and the corresponding components of the waveguide feed is shown in FIG. 5. While L-shaped waveguides can be designed to excite either the TE10 or TE01 modes, the exemplary antenna 72 shown in FIGS. 4-6 utilizes an L-shaped waveguide that has been flared to support reception of both the vertical and horizontal polarizations and, thus, form a larger aperture, dual-polarized horn.

In one exemplary case, the final aperture size of the horn 72 is 4.35 mm by 4.35 mm. Due to the small size of the flared L-shaped waveguide, only the dominant TE10 and TE01 modes are excited. A 1×10 linear array of miniature dual polarized dielectrically filled horn antennas was designed from these exemplary horn antennas to provide the broadband and low loss reception of signals for a wide range of scan angles. In this case, the simulated cross polarization isolation was better than 11 dB from 34 to 37 GHz, and better than 8.5 dB from 37 to 40 GHz. Moreover, each individual horn element provided a simulated gain of 5 dB, and demonstrated a suitable beamwidth for wide angle phased array scanning. Adjacent horn antenna elements were spaced 5.15 mm apart, thereby resulting in a complete compact dual polarized array.

Because the complete waveguide structure is filled with dielectric, the flared horn 72 serves as a matching transition for the incoming waves from free space. In fact, the dielectric filling helps contribute to a broadband match throughout the front-end components. The length of the horn 72 may then be selected for bandwidth optimization. The length of the horn 72 may also be selected in accordance with the coupling of the excited modes between the horn 72 and the orthogonal waveguides, and therefore the level of cross-polarization power.

The return loss and cross-polarization characteristics of the horn 72 and supporting waveguide feeding structure were investigated via simulations of an exemplary embodiment with Ansoft HFSS. The −10 dB return loss over a frequency range from 32 to 40 GHz was analyzed for various lengths of the flared horn followed by the associated waveguide feed. When receiving signals for either polarization, suitable bandwidths for the exemplary range were obtained with flared horn lengths ranging from about 1.6 mm to about 2.1 mm. In addition, simulations were performed to observe the received cross-polarization signal-power level compared to that of the co-polarization at 36 GHz. Suitable cross-polarization signal discrimination was observed for flared horn lengths of about 1.9 mm and above. Based on the foregoing simulation analyses, one exemplary embodiment had the flared horn length at 2.0 mm, which provides an excellent bandwidth and a cross-polarization level better than 19 dB.

The L-shaped waveguide section 73 is generally implemented to support the necessary field excitation for the two polarizations, as well as provide a broadband transition between the horn antenna 72 and the waveguide feeds 68, 70. Adjusting the length of the L-shaped transition 73 was found to be useful in optimizing the bandwidth and cross-polarization discrimination. Generally speaking, when the L-shaped waveguide 73 is designed with a longer length, greater distortion of the fields is necessary to excite the two polarizations. Further simulation results for various lengths of the L-shaped transition waveguide 73 are shown in FIG. 7(*a*), where the other dimensions of the horn and feed structure are maintained at the final designed values set forth in Table 1 below. The respective designations (e.g., $L_t$, $W_t$, $L_h$, etc.) for the dimensions are defined in FIG. 6. Also, a parametric study was conducted to observe the gain of the co-polarized and cross-polarized radiation at 36 GHz as a function of the L-shaped transition waveguide length, where the results are plotted in FIG. 8(*a*). However, any arbitrary dimension, not limited to the dimensions described in FIGS. 7(*a*)-(*c*) and FIGS. 8(*a*)-(*c*), may be implemented.

TABLE I

DIMENSIONS OF THE ANTENNA AND WAVEGUIDE FEED

| | | |
|---|---|---|
| $L_t = 0.54\, \lambda_o$ | $W_t = 0.35\, \lambda_o$ | $H_{t1} = 0.46\, \lambda_o$ |
| $L_h = 0.24\, \lambda_o$ | $W_h = 0.10\, \lambda_o$ | $H_{t2} = 0.27\, \lambda_o$ |
| $X_o = 0.17\, \lambda_o$ | $Y_o = 0.19\, \lambda_o$ | $H_h = 0.10\, \lambda_o$ |

The design of the flared L-shaped horn antenna 72 may also be based upon several other dimensional parameters, two of which include the length of the horn $L_h$, and the extent of the notched inset, $x_o$, at the aperture's air-dielectric interface. The effect of the notched inset in the y-direction, $y_o$, is very similar to that of $x_o$. The shape of the aperture of the horn antenna 72 may be square or L-shaped, depending upon the selection of $x_o$ and $y_o$. Through simulations with Ansoft HFSS, it was confirmed that, with the selection of the antenna parameters identified above, minimal power reflections occur at the air-dielectric interface at the aperture.

As with the length of the L-shaped transition section 73, the antenna bandwidth and cross-polarization discrimination may be based upon the horn length and extent of the notched inset of the horn 72, where the results of a parametric study are shown in FIG. 7(*b*) and FIG. 8(*b*) for variations of the horn length. The length of the horn 72 may serve as a matching transition between free space and the dielectric filled waveguides, where the largest bandwidth occurs for horn lengths ranging from $0.20\lambda_o$ to $0.25\lambda_o$. Variations of the notched inset at the air-dielectric interface of the aperture are shown in FIG. 7(*c*) and FIG. 8(*c*), where in this study, $y_o$ increased at the same rate as $x_o$, with all other parameters remaining fixed at the final designed values. The extent of the notched inset is also a useful parameter, where a larger notch not only decreases the aperture area and consequently decreases the gain, but a larger notch also decreases the bandwidth due to the higher quality factor. However, to maintain low cross-polarization radiation, the notched inset is also useful for supporting the proper excitation of the fields for the vertical and horizontal polarizations.

The final exemplary simulation design values for the horn antenna 72 and the waveguide transition 73 are summarized in Table 1. This particular design allows for −10 dB return loss bandwidth of 11% with 28 dB cross-polarization discrimination for one of the waveguide ports and 12% bandwidth with 19 dB cross-polarization discrimination for the other port. It should be noted that for both ports, the largest return loss is −8 dB from 34 to 40 GHz, which therefore corresponds to a −8 dB return loss bandwidth of 16%.

The simulation parameter values set forth above are provided with the understanding that the values are exemplary in nature only, and have been specified for a specific frequency range and other contextual criteria. Other design parameter values will be appropriate for other frequency ranges, applications and contexts. As a result, the design parameters may extend beyond the ranges depicted and covered in the graphs or plots discussed above.

With the planar tray-based architecture described above, the waveguides coupled to the antenna 72 eventually lay flat and in line with the substrate 48 (FIG. 2) in order to launch the signals onto the microstrip. To that end, for each unit cell (i.e., antenna), one of the two waveguides 68, 70 includes a waveguide twist 74, such as a ninety-degree, step-twist junction. Other waveguide twists, such as a continuous twist, may alternatively be used. In alternative embodiments, the horn antenna 72 may be excited by a probe disposed along the waveguides 68, 70 to excite the horn antenna 72 via the L-shaped excitation element 73. The waveguide twist 74 is useful in millimeter-wave systems due to the ease of fabrication, its broadband characteristics and low insertion loss. The design of the waveguide twist 74 may be based on maintaining constant wave impedance throughout each section of the twist 74. Also, the bandwidth of the twist 74 is based on the number of twist sections. Through further simulations with Ansoft HFSS, one optimized design included a four-section step twist, which provided a −20 dB return loss bandwidth from 33 to 47 GHz. Each section of the exemplary twist 74 had a length of 2.0 mm.

To obtain a broadband transition to the microstrip-based components (e.g., the Rotman lens 64) of the front-end device, a pair of waveguide to microstrip transitions 76 are included for each waveguide 68, 70. Each transition 76 interfaces with a complementary tab 78 protruding from the circuit substrate 48, as best shown in FIG. 2. More specifically, signals from each of the waveguides 68, 70 are coupled to microstrip array lines 80 (FIG. 2) on the substrate 48 through the low loss waveguide to microstrip transitions 76. Together, the transitions 76 and the matching tabs 78 form reduced height waveguides, where the height of the waveguide may correspond with the height of the substrate (e.g., 0.38 mm). The reduction in height is shown in FIG. 5 via the tapered profile of the transitions 76. Further information regarding the coupling of a microstrip and waveguide via a transition section is set forth in Ortiz et al., "A perpendicular aperture-fed patch antenna for quasi-optical amplifier arrays," *IEEE AP-S Int. Symp. Dig.*, vol. 4, pp. 2386-2389 (1999), the disclosure of which is hereby incorporated by reference in its entirety. Briefly, and in accordance with an exemplary embodiment, the microstrip is mounted onto a 16 mil thick copper ground plane and the substrate 48 is cut into tabs that are the same width as the waveguides 68, 70. When the waveguide structure is placed upon the tabs, the copper ground plane then serves as the bottom wall of the waveguide 68, 70. The substrate 48 effectively serves as a dielectric-filled waveguide (e.g., a dielectric with relative permittivity 3.27), which allows for the match to the waveguide 68, 70 and horn antennas 72, which are also dielectric-filled (e.g., relative permittivity 3.0). In one exemplary case, the width of the tabs 78 and the waveguides 68, 70 is about 2.9 mm. In any case, the insertion of the tabs 78 into the transitions 76 provides a broadband and low loss coupling of the waveguide sections and the microstrip array ports leading to the Rotman lens 64. An alternative microstrip to waveguide transition suitable for use with the disclosed devices and structures is described in U.S. Pat. No. 6,087,907, entitled "Transverse electric or quasi-transverse electric mode to waveguide mode transformer," the disclosure of which is hereby incorporated by reference.

The reduced height dielectrically filled waveguide is a low loss and convenient mechanism to couple energy to a waveguide at, for instance, the Ka band, because the substrate from the microstrip can be used to form the waveguide. Exemplary designs of the transition section may be based upon the wave impedances of the waveguides, which can be described in terms of the wave power definition for the single TE10 mode as $$Z = \frac{b}{a} \frac{2\pi\mu_o f}{\sqrt{k^2 - k_c^2}}$$

where the height b and width a are varied to provide the necessary impedance transformations. Also, the wavenumber k is dependent upon the dielectric material filling the waveguide. One exemplary design begins with a reduced height waveguide, where the height of the waveguide is equal to the 0.38 mm height of a TMM3 substrate. Here, the TMM3 substrate is machined into tabs of 1 mm length and 2.9 mm width, which is placed into the reduced height waveguide, thereby forming the transition to the dielectric filled waveguide. Following the reduced height waveguide section, an E-plane stepped homogeneous waveguide transformer is implemented to allow for the proper matching between the reduced height waveguide and the waveguide of 0.7 mm height, which feeds the antenna. The transition to the 0.7 mm height waveguide supports the matching of the wave impedance to that of the step twist junction, while providing a higher fabrication tolerance.

With reference now to FIGS. 9 and 10, the antenna array and corresponding waveguide feeds may be disposed in a two-shell (or block) housing 82 having a top block 84 and a bottom block 86 separated by an isolating copper ground plane 88. In some cases, the blocks 84, 86, when assembled to form the housing 82, may be integrated as part of the tray-based architecture. In some cases, the blocks 84, 86 may be components of an integrated tray housing (as shown, for instance, in FIG. 15). In other cases, the tray-based architecture includes the housing 82 as a separate element from any housing or structure dedicated to the circuitry (as shown, for instance, in FIG. 2). More generally, the front-end structure that includes the dual-polarized horn antennas 72, the orthogonal positioned waveguide feeds 68, 70, and the reduced height waveguide transitions 76 may be formed as sets via the two individual blocks 84 and 86. More specifically, the block 84 forms the step-twist waveguides and top section of each L-shaped horn antenna, and the block 86 forms the straight waveguides and bottom section of each L-shaped horn antenna. The ground plane 88 provides the separation between the two waveguide feed lines and is shaped in the areas of the L-shaped waveguide and horn antenna. In the exemplary embodiment shown in FIGS. 9 and 10, each of the blocks 84, 86 contains 10 dual-polarized unit cells with an element spacing of 5.15 mm, or 0.618$\lambda$ at 36 GHz. Other embodiments may have smaller element spacing (e.g., only 0.4$\lambda$). FIG. 10 best depicts the underside of the block 84, which defines the waveguide feeds 70 having the waveguide twists 74.

A stereolithographic process may be employed to fabricate the blocks 84, 86. For example, a Somos 9120 photopolymer may be exposed in a layer-by-layer process to build a polymer body for each block 84, 86. The formation of the underlying structure for each block 84, 86 is followed by a nickel plating process (or other conductive coating, as desired). Other fabrication techniques capable of obtaining sufficiently sharp corners and vertical sidewalls may be used, such as computer numerically controlled (CNC) machining, silicon micromachining, or fabrication with low temperature co-fired ceramic (LTCC) materials. The device structure having the dual polarized horn with associated waveguide feeds is assembled by stacking the stereolithographic blocks onto either side of the copper ground plane (as shown in FIG. 9), where alignment and complete contact between the blocks 84, 86 is achieved by fastening through alignment holes 90 in each element of the structure.

In an alternative embodiment, the antenna array and corresponding waveguide feeds may be disposed in a housing with any number of stacked blocks, for example, as a three-block housing (not shown), with a top block, a middle block, and a bottom block. As in the previous embodiment, the three blocks are fabricated and then stacked upon each other. In this case, the bottom block forms the ten waveguide step twists, the middle block forms the ten straight waveguide sections, and the top block provides closure to the structure. In this way, one set of waveguides is formed in between the top and middle blocks, while the other set of waveguides is formed in between the middle and bottom blocks. At the end of each block, all elements are flared to form the horn antenna elements, as in the previous embodiment.

FIG. 11 depicts an exemplary beam control module in greater detail. In the tray-based embodiments described above, two separate, dedicated control modules are provided for the horizontal and vertical polarizations. The circuitry of these control modules is disposed on the top and bottom of each tray, respectively, with the corresponding phase shifting network. The control circuitry generally implements the selection of the scan angle from the Rotman lens beam ports and, for the receive case, develops an output signal on an RF output line 91. Likewise, for the transmit case, the RF input line 91 may support the excitation of energy into the lens. In this embodiment, the beam control module includes a hybrid implementation of a switch 92 and an amplifier (e.g., LNA) 94. In alternative embodiments, amplifier devices may be disposed immediately after each waveguide transition 76 (see, e.g., FIGS. 4 and 5), rather than having the single amplifier 94 placed after beam ports 96 of the Rotman lens 64 (FIG. 3), as shown in FIG. 11. Amplifiers may alternatively or additionally disposed at any other location along the transmission lines. Selection of the Rotman lens beam port 96 is achieved through proper biasing of the switch 92, which may be a M/A-COM MA4AGSW8-1 SP8T PIN diode switch. To that end, DC bias lines 97 and DC blocking capacitors 98 are provided. DC biasing of the switch 92 is achieved through the DC blocking capacitors 98 (e.g., 5 pF single layer capacitors), which are placed onto the microstrip lines leading to the switch 92. The DC bias lines 97 are respectively utilized for each port of the switch 92, and wirebond air bridges are implemented to allow for the routing of the DC lines 97 to the respective beam ports 96. The switch 92 may be mounted with conductive epoxy onto the common copper ground plane, and wirebonds may be used to connect the microstrip beam ports 96 to the respective bonding pads. The amplifier 94 (e.g, a Mimix XL1000 LNA) may also be mounted with conductive epoxy onto the common ground plane. In one exemplary case, the amplifier 94 may be an LNA providing a gain of 17 dB with a noise figure of 2.8 dB at 35 GHz.

In an alternative embodiment, single-pole multiple-through or multiple-pole multiple-through switches are implemented. The switches may be cascaded such that the outputs from one or more switches are fed into the input of another switch. With this configuration, a single modular switch matrix is formed.

In some embodiments, the front-end circuitry, including the Rotman lens, may not include microstrip-based components. Any type of transmission line may be incorporated or involved therein, including, for instance, waveguides, stripline, co-planar waveguide, etc. Accordingly, it may not be necessary to incorporate a microstrip to waveguide transition. Some embodiments may include a transition from another desired type of transmission line to the waveguide.

In accordance with some embodiments, the enhancement of Rotman lens properties through alterations within the lens is now described. Generally speaking, the lens alterations may include material or structural modifications, or a combination thereof. In any case, the modifications involve a material property encountered by the signals passing through the Rotman lens to enhance the operation of the Rotman lens.

At the outset, to minimize reflections within the lens, and therefore reduce phase errors, the above-described embodiments may have implemented the phase shifting network with a Rotman lens having terminated transmission lines, for example using absorbing material (e.g., Emerson and Cumming BSR-1) placed at any unused ports. See, for example, the Rotman lens 64 shown in FIG. 3 having unused ports 100. In each instance, the terminated transmission lines (and absorbing material) serves as a termination to minimize any undesired reflections, thereby reducing phase and amplitude errors.

With reference now to FIG. 12, an alternative Rotman lens 102 having enhanced capabilities (e.g., enhanced focusing) is now described. Generally speaking, the enhanced capabilities are facilitated via a material property variation encountered by signals processed by the Rotman lens 102. The material property variation may arise from a variation in materials, structure, or any combination thereof. In one case, the material property varied within the Rotman lens 102 is the permittivity encountered by the electromagnetic waves. By varying the permittivity, enhanced focusing is achieved as described below, and the electromagnetic waves are better focused onto the sets of array ports 104 and beam ports 106. However, the enhanced capabilities are not limited to a non-uniform permittivity (i.e., dielectric constant) experienced by signals passing through the Rotman lens 102. More generally, the manner in which the material property non-uniformities are realized, as well as the exact distribution thereof, may vary substantially between different embodiments. Thus, practice of this aspect of the disclosure is not limited to any one particular fabrication technique, material (e.g., dielectric), or distribution of materials (e.g., dielectrics). Nonetheless, in embodiments having the enhanced focusing feature, the Rotman lens 102 directs the power more efficiently between the array ports 104 and the beam ports 106 by avoiding, for instance, the direction of energy toward sides or ports 108, 110 of the Rotman lens 102.

In the exemplary embodiment shown in FIG. 12, the Rotman lens 102 includes dielectric contours of increasing relative permittivity to bend the rays within the lens 102 to focus the energy on the array ports 104. To this end, multiple regions 112, 113, 114, and 115 of varying (i.e., increasing) permittivity are disposed between the beam ports 106 and the array ports 104. A region 116 has yet another different permittivity relative to the other regions 112-115.

The varying permittivity of the regions 112-116 may be realized through different materials, material distributions, or any other desired mechanism. In one exemplary case, when the Rotman lens 102 is a micro-strip based lens disposed on a substrate, a periodic structure (or lattice) of holes may be machined (or otherwise formed) in the substrate to vary the effective permittivity experienced by the rays. In this case, the underlying operational mechanism of the Rotman lens 102 is based on a realization that in regions of higher hole density, the effective dielectric constant is lower, and therefore, the effective wavelength within these regions is larger. In this way, the same dielectric material (i.e., the substrate) may be used throughout the lens 102, but with varying degrees of a different dielectric material integrated therewith. The Rotman lens 102, in a sense, is provided with a synthesized dielectric composed of the original dielectric material and any material(s) occupying the holes. The synthesized dielectric constant is then determined by the fractional percent of the dielectric constant for the material filling the hole and the dielectric constant of the substrate. In one exemplary case, the dielectric material occupying the holes is air. Other cases may fill the holes with one or more dielectric materials (i.e., with different dielectric constants, as desired), leading to further flexibility in designing the permittivity distribution.

In one exemplary case, the dielectric constant may range from about 3.2 to about 6.0 between the regions 112-116. The substrate material may be, for instance, TMM6. The highest hole density would be in the region 112, and the region 116 would have no holes. As the signals proceed through the other regions 113-115 from the beam ports 106 toward the array ports 104, the dielectric constant may correspondingly vary from about 3.9 to about 5.1. In this case, each region 112-116 has a constant permittivity, although this need not be the case.

In another embodiment (see, e.g., FIGS. 13 and 15), the TMM6 substrate is still used, but in conjunction with a single triangular lattice of holes drilled into the substrate on the beam port side to obtain a synthesized dielectric of 3.0. The region of synthesized dielectric is again a mix of the dielectric constants for the TMM6 substrate and the air within the holes. In this case, to correctly synthesize this lower dielectric constant, the hole diameter may be no greater than $0.1\lambda$, such as 0.6 mm, or $0.04\lambda$. Any reflections at the interface of the two dielectrics contribute to less than 0.3 dB insertion loss. The reflections at the dielectric interface may be reduced by implementing a gradient of increasing dielectric constant, such as with the embodiment of FIG. 12. Through investigation of the design equations (see below), it was found that the dielectric constant of the synthesized dielectric can vary ±10% and continue to maintain the same scan angles with less than 10 dB sidelobes.

An exemplary case of the embodiment shown in FIG. 13 had the wedge-shaped dielectric contour at an angle $\gamma=70$ degrees and the position T located nearly midway within the lens. However, any shape, number, or distribution of the dielectric contours may be realized to achieve the desired enhancements.

An additional advantage of the varying permittivity involves a flatter (or straighter) array port contour, as shown in FIG. 12. The directionality imparted by the varying permittivity allows the layout of the Rotman lens 102 to have the array ports arranged in a more aligned fashion, such that the connections between the array ports and the antenna elements are increasingly direct (i.e., less meandering). As a result, any losses due to the meander lines between the phase shifting network and the antennas may be minimized. As a further result, the size of the front-end structure may be reduced.

An additional advantage of the varying permittivity involves the conditioning of the amplitude of the signals at the array ports in order to control the signal amplitude distribution across the antenna array. With the control of the amplitude of the signals at the antenna elements, enhanced radiation effects, such as lower sidelobes, can be achieved.

The embodiment of FIG. 12 also exhibits one possible feature of the permittivity distribution, namely regions of increasingly sharper contour. More specifically, to bend the rays within the lens even more than what would already be accomplished via the varying permittivity regions 112-116, the shape of the regions 112-116 may vary as well. As shown in FIG. 12, the contour of the regions 112-116 may change shape within the lens 102 to better focus the energy on the array ports 104. As with Snell's law, the rays bend toward the perpendicular of the contour line. If that perpendicular direction is increasingly pointed toward the centermost array port 104, then the bending will increase accordingly. For example, see contour lines 118 and 120 and the sharper angle formed by the contour line 120 (i.e., relative to the general direction of propagation between the beam ports 106 and the array ports 104). Notwithstanding the foregoing, the enhanced Rotman lens may be of any desired shape and size, and include any distribution of material property (e.g., permittivity) variation. Further information regarding the geometry of an embodiment having enhanced focusing is set forth in connection with FIG. 14.

The spacing between regions may also be adjusted or specified such that impedance match is provided between the beam ports 106 and the array ports 104. In this way, maximum power transfer occurs therebetween. Alternatively or additionally, the dielectric constant may vary continuously between the beam ports 106 and the array ports 104, such that no discrete regions of varying permittivity are created. Such configurations provide a continuous permittivity gradient and, thus, minimize power losses that may otherwise occur between discrete dielectric changes.

As stated above, any fabrication technique may be utilized to realize the lattice of holes. The perforation of a pre-existing substrate may be accomplished in any way, or a specialized substrate may be developed in a composite or other fashion to present the varying permittivity.

But the enhanced focusing feature is not limited to embodiments involving a synthesized substrate. On the contrary, embodiments involving a solid dielectric slab or cavity-based Rotman lens (as opposed to microstrip-based designs) may include a dielectric material with a modified structure (e.g., perforations or holes distributed throughout, as desired) or, alternatively or additionally, multiple dielectric materials with varying permittivities disposed within the cavity. Still further, the lens (cavity-based or otherwise) may be realized via photonic bandgap or other meta-materials that control the electromagnetic waves for enhanced focusing.

FIG. 13 depicts another low loss Rotman lens 122 to illustrate the manner in which the lens design bends exemplary rays 124-126 within the lens 122, thereby focusing the energy onto the array ports, such as arbitrary array port 130 at location (x,y). To attain the required phase distribution across the antenna ports, the original Rotman lens design equations are modified to accommodate for the effects of the ray bending and the varying effective wavelength. The following design methodology is based upon a Rotman lens with only two regions of different dielectrics for ease in description only, and with the understanding that the technique may be extended to designs having additional dielectric regions. In contrast to a similarly designed and fabricated conventional Rotman lens with a uniform dielectric constant, the two-region enhanced focus Rotman lens demonstrated 1.2 to 2.0 dB insertion loss improvement. By incorporating additional dielectric regions within the lens, additional (e.g., nearly 3 dB) insertion loss improvement can be achieved. An exemplary electric field distribution is also shown in FIG. 13 to exhibit the enhanced focusing.

With reference now to FIG. 14, the conventional Rotman lens design methodology with uniform dielectric constant involves solving three equations related to the path-length equality within the lens and meander lines, and the three equations related to the overall geometry of the lens. In the disclosed enhanced focus Rotman lens design, a similar set of three path-length equality equations are involved, yet a larger number of more complex geometrical equations are also involved due to the introduction of the dielectric contours. Also, as with the conventional Rotman lens, the disclosed enhanced focus Rotman lens establishes three beam ports with perfect phasing, which correspond to the center beam port for the broadside beam and two other beam ports which are selected upon the desired scan range.

The design formulations presented herein are based upon the geometry as depicted in FIG. 14. Similar to the conventional Rotman lens approach, the points on the array port contour P(x,y) are determined by solving a set of path-length equality and geometrical equations for each antenna array element located at a distance N from the center of the array. Further, the meander line length W from the array port contour to the linear antenna array is also determined by solving this set of equations.

The path length equality formulation for a single beam port, in this case the beam port located at $(F_{1x}, F_{1y})$, is described as $$|\vec{F_1A}|\sqrt{\varepsilon_{r1}} + |\vec{AO}|\sqrt{\varepsilon_{r2}} + W_o\sqrt{\varepsilon_{r3}} = \\ |\vec{F_1S}|\sqrt{\varepsilon_{r1}} + |\vec{SP}|\sqrt{\varepsilon_{r2}} + W\sqrt{\varepsilon_{r3}} + N\sin\alpha \quad (1)$$

where the first half of the equation represents the total path length of a ray from the beam port, passing through a point A on the dielectric contour, and ending at the center array port with meander line length $W_o$. The second half of the equation represents the total path length of a ray from the same beam port, passing through a point S on the dielectric contour, and ending at a particular array port with meander line length W to an array element at a distance N from the center of the lens. To achieve the proper phase difference at the array port and realize the necessary phase front for beam scanning at an angle α, the factor of Nsin α must be added to the second half of the equation. Similar path length equality equations are derived for the other two beam ports of perfect phasing.

The geometrical related equations can be derived by satisfying Snell's law along with the dimensions as depicted in FIG. 14. In particular, at the dielectric interface, the ray bends as $$\sqrt{\varepsilon_{r1}}\sin\theta_i = \sqrt{\varepsilon_{r2}}\sin\theta_r. \quad (2)$$

The beam port contour is of arbitrary, desired shape. As an exemplary case, a circular beam port contour may be formed, where the radius and location of this contour is determined by the choice of the beam ports for perfect phasing, corresponding to the ±α scan angles. As with the conventional Rotman lens, all other beam ports on this circular beam port contour result in minimal phase errors at the array ports. Therefore, discrete beam steering throughout a range of scan angles can be achieved. The beam port contour can be determined as $$\frac{G}{F} = 1 + \frac{\alpha^2}{2}. \quad (3)$$

FIG. 15 depicts the assembly of a phased array front-end device indicated generally at 132 having an enhanced focus Rotman lens 134 indicated generally at 134 and integrated into a low-profile, tray-based architecture well suited for, e.g., a phased array system. In this case, the Rotman lens 134 is one of two lenses placed on either side of a common ground plane. On the top side of the ground plane, a Rotman lens indicated generally at 136 may be directed to processing signals of one polarization, while the Rotman lens 134 may directed to processing signals of an orthogonal polarization. The double-sided circuit configuration formed by the two lenses 134, 136 may be easily integrated in a tray-based structural arrangement that also includes a housing 138 for an antenna array 140, which may include the dual-polarized antenna elements described hereinabove.

Generally speaking, the front-end devices and systems described above may be implemented in a scheme involving independent control of two orthogonal polarizations. For instance, the two ports of each dual-polarized antenna element may be excited simultaneously to support the orthogonal polarizations. However, the devices and systems described above may be implemented in schemes involving the excitation of more than one beam port of the phase shifting network (e.g., Rotman lens), in which case multibeam capabilities may be achieved. More specifically, because the Rotman lenses described above include multiple beam ports, a dual-polarized, multibeam phased array may be realized by simultaneously switching to more than one beam port.

With reference now to FIG. 16, the devices and systems described above may also be utilized to implement a circular polarization scheme. The double sided circuit tray based phased array configurations described above enable the transmission/reception of two orthogonal polarizations, i.e., the vertical and the horizontal polarization. As described above, the circuitry on one side of the tray controls the vertical polarization, while the circuitry on the other side of the tray controls the horizontal polarization. To achieve circular polarization, a pair of such circuits are incorporated into front-ends 150 and 152a dedicated to supporting the two orthogonal polarizations, e.g., vertical polarization and horizontal polarization. The front ends 150, 152 are operated at the same time, yet with a 90 degree phase addition (or subtraction) introduced via a phase element 154 to either the top circuit or the bottom circuit in order to achieve right- (or left-) hand circular polarization. Elliptical polarization can be achieved by applying any other phase difference between 0 and 180 degrees. The phase element 154 and, more generally, this circular and elliptical polarization scheme, may be implemented either through hardware (e.g., a physical delay or subtraction of 90 degrees), software (e.g., by individually processing the signals for the vertical and horizontal polarization channels), firmware, or any desired combination thereof.

While shown separately for ease in illustration, the front-ends 150 and 152 may utilize a common antenna array in accordance with the structures described above.

Turning to FIG. 17, the devices and systems described above may also be utilized to generate sum and difference beams for monopulse radar schemes. With phased array radars having the lens-based configurations described herein, the location of multiple targets can be more readily determined because both the sum and difference beams can be scanned. The tray-based lens circuit implementations described herein include two sets of circuitry capable of supporting the two beams. As described above, two such circuits indicated generally at 156 and 158 are placed on opposite sides of a ground plane in a tray (see, for example, FIGS. 2 and 15). The circuit 156 is dedicated to the sum beam, and may be the same as the conventional lens-based circuitry described above. More specifically, the circuit 156 may have a Rotman lens 160, beam ports 162, array ports 164, and meander transmission lines 166 coupled to an antenna array 168. As with the embodiments described above, the meander lines 166 of the circuit 156 are configured to present a consistent path length across the array. The circuit 158 may include similar components, but dedicated to supporting the difference beam (as shown in FIG. 17). To that end, the components of the circuit 158 differ in that an additional 180-degree phase length path 170 is inserted into meander lines 172 directed to one-half (or side) of the array 168 (i.e., either the right or left side).

More generally, the 180 degree phase difference need not utilize the paths 170, but rather may utilize other phase delay techniques. Indeed, a variety of ways to achieve the 180 degree phase difference are well-suited for use, such that the implementation of the phase difference is not limited to an extra (or cut) length of meander line. To achieve the added or subtracted 180 degree phase difference, any one of a number of available phase shifter circuit devices or time delay/advancement mechanisms may be utilized. For instance, the phase difference may be effected via a modification to the transmission line. Such modifications may involve, for example, a different substrate material or other modification to create a different dielectric constant.

While shown separately for ease in illustration, the antenna arrays 168 of the two circuits 156 and 158 may, in fact, be the same antenna array arranged in the double-sided tray configuration above. That is, the sum and difference beams may be generated by a single antenna array that takes advantage of the structures described above.

Notwithstanding the advantages of the tray-based architecture, the miniature dual-polarized antenna array, and the enhanced Rotman lens device described above, the monopulse radar scheme described in connection with FIG. 17 is not limited to any one particular architecture, antenna array structure, or Rotman lens type. On the contrary, the monopulse radar scheme may be implemented with a variety of front-end devices and structures incorporating a Rotman lens as a phase shifting network component. Implementation is not limited to any one type of Rotman lens.

The monopulse radar scheme is not limited to the embodiment depicted in FIG. 17, inasmuch as a single circuit having an array of switches may be employed to provide both the sum and difference beams. More specifically, a number of two-position switches could be incorporated into the transmission lines having the meander line to alternate between a 0 degree phase difference path and the 180 degree phase difference path. The sum beam would be generated while the switches were collectively in one position, and the difference beam would be generated with the switches collectively in the other position.

The exemplary devices and systems described above may be designed and implemented in connection with a millimeter-wave phased array receiver system, which may be extended to accommodate both transmit and receive functions through additional switch circuitry placed after the phase shifting network. While each component of the devices may be individually designed and optimized for broadband performance in a particular frequency range, e.g., from 34 to 40 GHz, the devices, structures and systems described herein are readily scalable for other (e.g., higher) frequency ranges.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A front-end device for a phased array system, comprising:
    an antenna array; and,
    a phase-shifting network to couple the antenna array to the phased array system;
    wherein the phase-shifting network comprises a Rotman lens having a plurality of beam ports and a plurality of array ports and a plurality of regions each varying in a material property from another, wherein the regions extend from an inner portion of the Rotman lens to a peripheral portion of the Rotman lens; and,
    wherein any signals passing between one or more of the plurality of beam ports and one or more of the plurality of array ports encounter the varying material property within the Rotman lens.

2. The front-end device of claim 1, wherein the material property is permittivity such that a permittivity variation enhances focusing within the Rotman lens.

3. The front-end device of claim 2, wherein the Rotman lens comprises a microstrip and a substrate on which the microstrip is disposed, and wherein the substrate comprises a hole distribution to effect the permittivity variation.

4. The front-end device of claim 3, wherein the hole distribution comprises a lattice of holes filled with a number of dielectric materials.

5. The front-end device of claim 2, wherein the Rotman lens comprises a housing defining a cavity through which the signals pass, and wherein the cavity is filled with a number of dielectric materials to effect the permittivity variation.

6. The front-end device of claim 2, wherein the Rotman lens comprises the plurality of regions, each of which has a different permittivity to effect the permittivity variation.

7. The front-end device of claim 6, wherein the plurality of regions are wedge-shaped.

8. The front-end device of claim 2, wherein the Rotman lens comprises a dielectric component having a continuously varying dielectric constant, such that the permittivity variation has a continuous gradient.

9. The front-end device of claim 1, wherein the material property is permittivity and wherein each of the plurality of regions is adjacent to another of the plurality of regions such that permittivity increases along a signal path in the Rotman lens.

10. The front-end device of claim 1, wherein each of the plurality of regions vary in permittivity, and wherein at least some of the plurality of regions vary in shape.

11. The front-end device of claim 10, wherein the variation in the material property is such that the Rotman lens is able to maintain less than 10 dB sidelobes with respect to a main beam across all scan angles.

12. The front-end device of claim 1, wherein each of the plurality of regions is formed of the same dielectric material and wherein each of the plurality of regions has a different hole distribution to effect the permittivity variation.

13. A front-end device for a phased array system, comprising:
an antenna array; and,
a phase-shifting network to couple the antenna array to the phased array system;
wherein the phase-shifting network comprises a Rotman lens having a plurality of beam ports and a plurality of array ports and a plurality of regions each varying in a material property from another, the plurality of regions being configured such that all signals passing between the plurality of beam ports and the plurality of array ports encounter at least two regions of varying material property from one another.

14. The front-end device of claim 13, wherein the material property is permittivity such that a permittivity variation enhances focusing within the Rotman lens.

15. The front-end device of claim 13, wherein the Rotman lens comprises a housing defining a cavity through which the signals pass, and wherein the cavity is filled with a number of dielectric materials to effect the permittivity variation.

16. The front-end device of claim 13, wherein the Rotman lens comprises the plurality of regions, each of which has a different permittivity to effect the permittivity variation.

17. The front-end device of claim 13, wherein the Rotman lens comprises a dielectric component having a continuously varying dielectric constant, such that the permittivity variation has a continuous gradient.

18. The front-end device of claim 13, wherein the material property is permittivity and wherein each of the plurality of regions is adjacent to another of the plurality of regions such that permittivity increases along a signal path in the Rotman lens.

19. The front-end device of claim 13, wherein the variation in the material property is such that the Rotman lens is able to maintain less than 10 dB sidelobes with respect to a main beam across all scan angles.

20. A front-end device for a phased array system, comprising:
an antenna array; and,
a phase-shifting network to couple the antenna array to the phased array system;
wherein the phase-shifting network comprises a Rotman lens having (i) a plurality of beam ports each sharing a beam port region having a first material property, (ii) a plurality of array ports each sharing an array port region having a second material property different than the first, and (iii) a plurality of regions between the beam port region and the array port region and each varying in a material property from another and from the first material property and the second material property.

* * * * *